(12) United States Patent
Holczer-Waroquet

(10) Patent No.: US 11,482,129 B2
(45) Date of Patent: Oct. 25, 2022

(54) SYSTEM AND METHOD FOR TEACHING PIANO AND NOTE READING

(71) Applicant: Vera Holczer-Waroquet, Aurora, OH (US)

(72) Inventor: Vera Holczer-Waroquet, Aurora, OH (US)

( * ) Notice: Subject to any disclaimer, the term of this patent is extended or adjusted under 35 U.S.C. 154(b) by 0 days.

(21) Appl. No.: 17/182,059

(22) Filed: Feb. 22, 2021

(65) Prior Publication Data

US 2021/0264807 A1    Aug. 26, 2021

Related U.S. Application Data

(60) Provisional application No. 62/979,630, filed on Feb. 21, 2020.

(51) Int. Cl.
| | | |
|---|---|---|
| *G09B 15/08* | (2006.01) | |
| *G09B 1/40* | (2006.01) | |
| *G09B 15/02* | (2006.01) | |
| *G10G 1/02* | (2006.01) | |

(52) U.S. Cl.
CPC .............. *G09B 15/08* (2013.01); *G09B 1/40* (2013.01); *G09B 15/026* (2013.01); *G10G 1/02* (2013.01)

(58) Field of Classification Search
CPC ........ G09B 15/08; G09B 1/40; G09B 15/026; G10G 1/02
See application file for complete search history.

(56) References Cited

U.S. PATENT DOCUMENTS

| | | | | |
|---|---|---|---|---|
| 1,201,769 A | * | 10/1916 | Siegel | G10C 3/12 84/423 R |
| 1,340,569 A | * | 5/1920 | Siegel | G09B 15/08 84/423 R |
| 1,526,547 A | * | 2/1925 | Hughey | G09B 15/026 84/471 R |
| 1,945,398 A | * | 1/1934 | Gregg | G09B 15/026 84/471 R |
| 2,315,793 A | * | 4/1943 | Jay | G09B 15/00 84/476 |
| 2,447,213 A | * | 8/1948 | Sledge | G09B 15/026 84/470 R |
| 4,819,539 A | * | 4/1989 | Searing | G09B 15/023 273/301 |
| 4,832,605 A | * | 5/1989 | Bragin | G09B 1/08 434/168 |
| 5,496,179 A | * | 3/1996 | Hoffman | G09B 15/003 434/433 |
| 5,540,132 A | * | 7/1996 | Hale | G09B 15/026 434/428 |
| 6,057,501 A | | 5/2000 | Hale | |
| 6,086,378 A | * | 7/2000 | Johnson | G09B 15/026 273/236 |

(Continued)

FOREIGN PATENT DOCUMENTS

TW    201503073 A    1/2015

*Primary Examiner* — Robert W Horn

(57) ABSTRACT

A system and method for teaching children in the field of music, and more particularly to teach children to play the piano and read musical notes using physical objects with images of characters assigned to fingers and animals assigned to musical notes, with assigned colors and shapes, and all incorporated within themed environments presented in continuing stories.

17 Claims, 36 Drawing Sheets
(35 of 36 Drawing Sheet(s) Filed in Color)

(56) References Cited

U.S. PATENT DOCUMENTS

| | | | |
|---|---|---|---|
| 6,870,085 B2* | 3/2005 | MacCutcheon | G09B 15/023 |
| | | | 84/477 R |
| 7,414,186 B2 | 8/2008 | Scarpa et al. | |
| 9,472,117 B2* | 10/2016 | Ashurkoff | G09B 15/026 |
| 10,013,961 B1* | 7/2018 | Campbell | G10G 1/02 |
| 10,332,415 B2 | 6/2019 | Warren | |
| 2010/0005952 A1 | 1/2010 | Lamon | |
| 2021/0264807 A1* | 8/2021 | Holczer-Waroquet | |
| | | | G09B 15/008 |

* cited by examiner

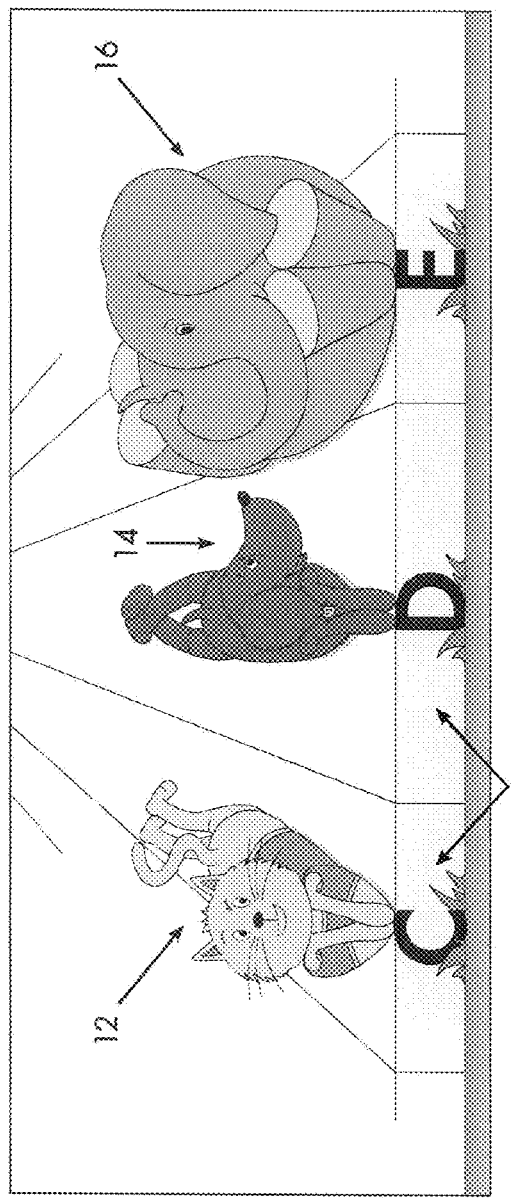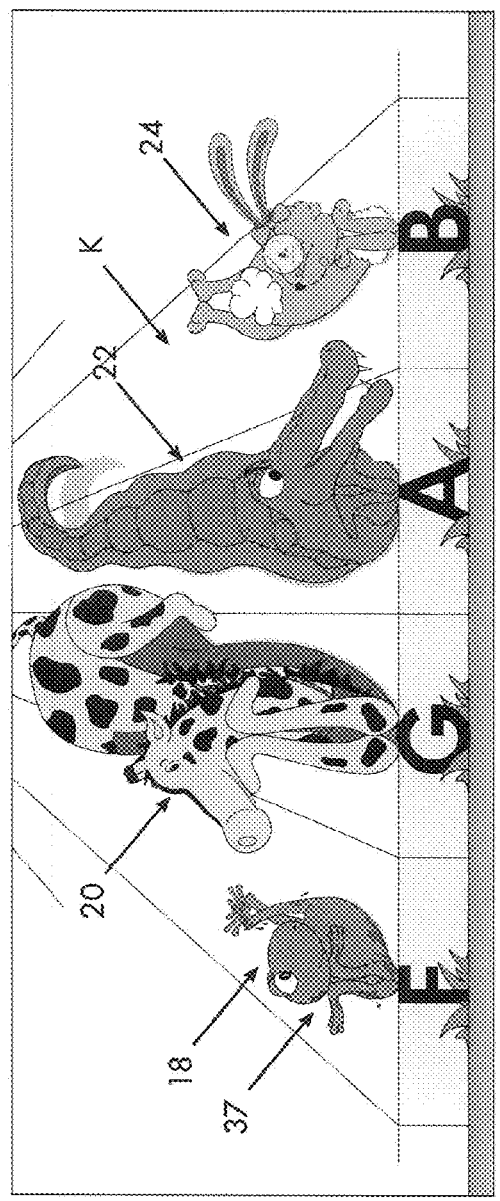

FIGURE 11
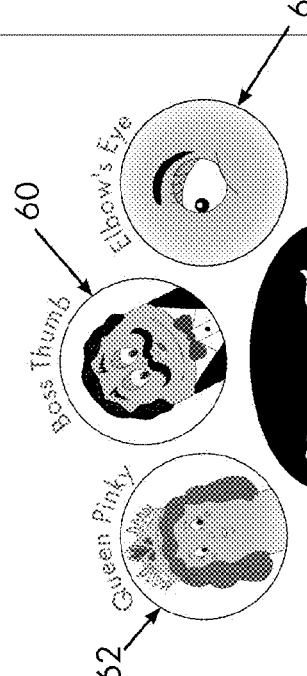
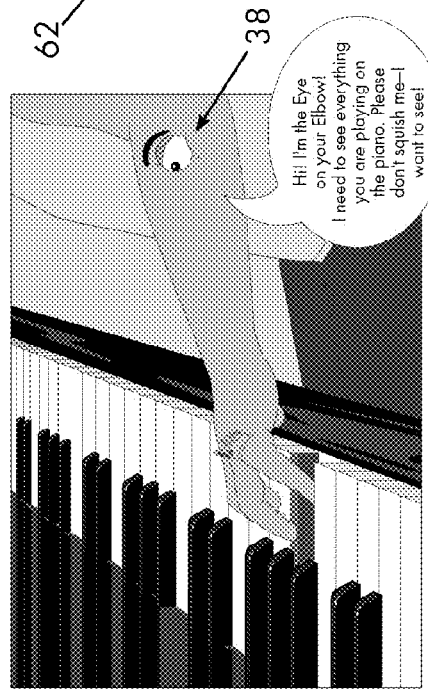

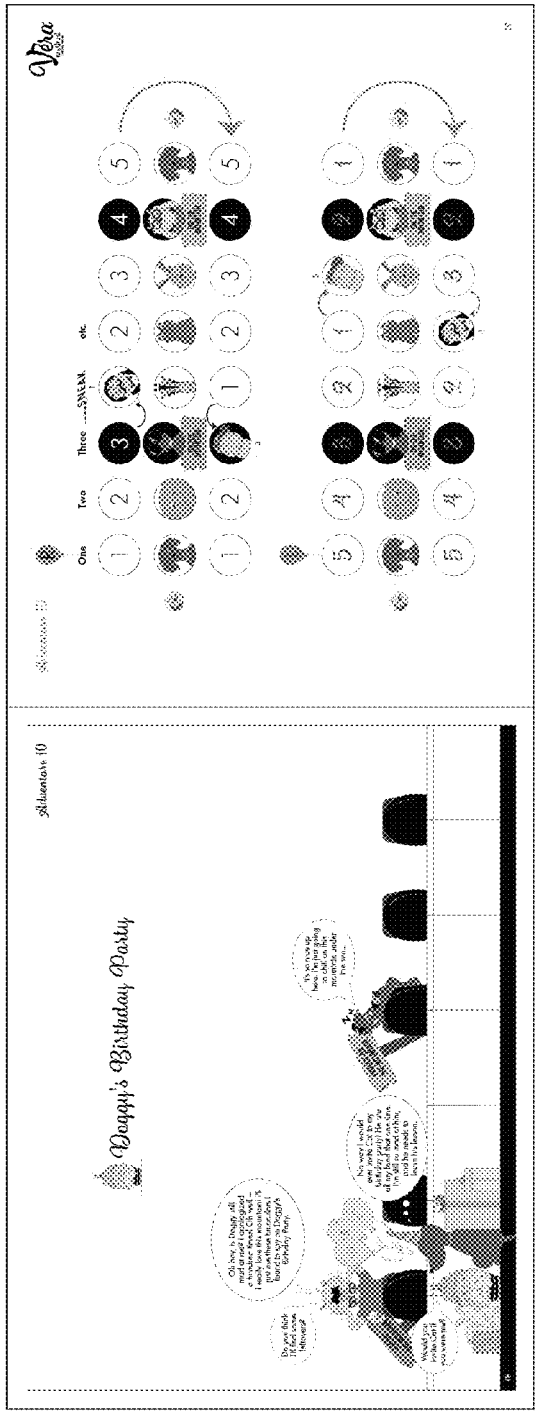
FIGURE 17A
FIGURE 17B
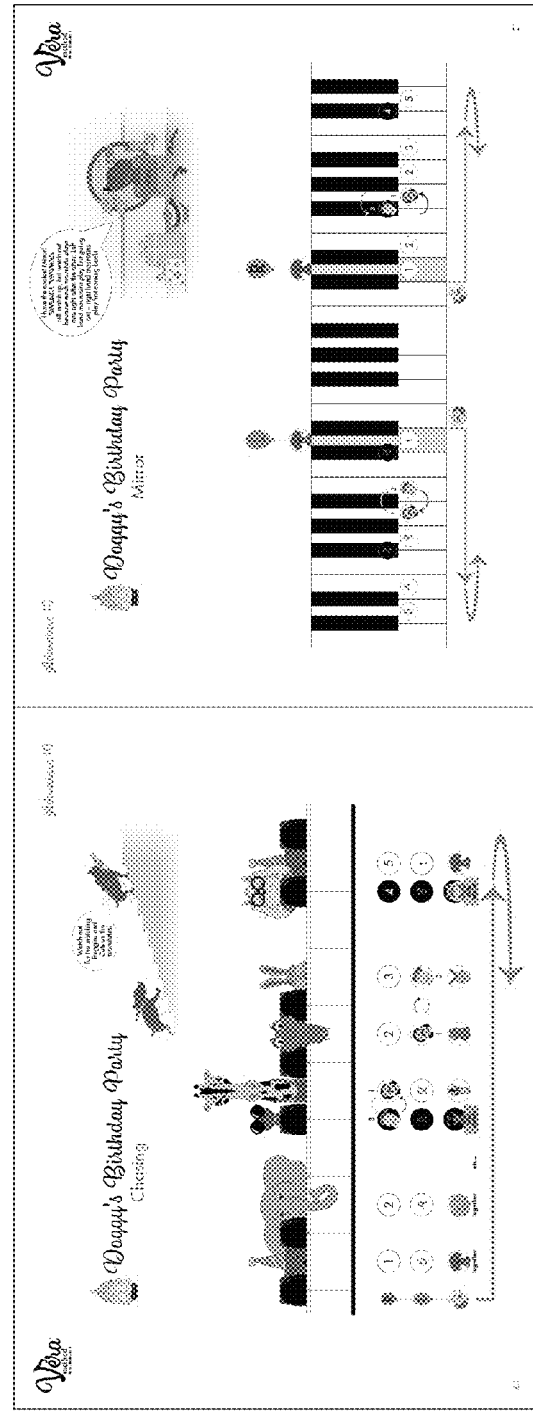
FIGURE 17C
FIGURE 17D

Reference Guide/Index

| PAGE | SYMBOL | NAME | DEFINITION | PAGE | SYMBOL | NAME | DEFINITION | PAGE | SYMBOL | NAME | DEFINITION |
|---|---|---|---|---|---|---|---|---|---|---|---|
| ADVENTURE 1 | | | | ADVENTURE 4 | | | | ADVENTURE 9 | | | |
| | The Seven Little Wonders | | | Magic Finger Walk; p.21 | | Mirror | Contrary Motion (scales & exercises) | p.44-45 | | Make the Sun Come Out! | Shifting Up & Down |
| p.4-7 | | Doggy House | Two Black Key Structure | | | Repeat | Play the preceding section again (Often with 'Flip!') | ADVENTURE 10 | | | |
| | | Two Door House | Three Black Key Structure | ADVENTURE 5 | | | | | | Stretch Drum | Downward excursion of the Drum interval in order to create an inverted dominant harmony: G 🎵 , G 🎵 |
| | | Songbird | Sing all text next to this icon | p.24-29 | | Many Fingers | 3-finger combinations (to diversify fingering on each hand) | Hot Cross Buns, Au Clair de La Lune, French Lullaby, Mary Had a Little Lamb; p.51-53 | | | |
| | | R&L Pointer | Only use the pointer finger in either hand to play the song | Hungry Cat, Elephant Hug; p.28-29 | | Walking Note | ♩ Quarter Note = 1 beat | | | Distracted Note | ♩ Dotted Half Note = 3 beats |
| Hello Mommy; p.8-9 | R | R | Right Hand Represented in BLACK | | | Pole Note | ♩ Half Note = 2 beats | ADVENTURE 11 | | | |
| | L | L | Left Hand Represented in RED | | | Balloon Note | 𝅝 Whole Note = 4 beats | | | Shrink | Downward shrinking of the Drum interval in order to create an inverted predominant harmony: C 🎵 , C 🎵 |
| | fine | Fine | The end of the song | p.28, 40 and 52 | | Music Planner | Time Signatures: Each measure contains 4 quarter-note beats (or 2 or 3, respectively) | p.59-61 | | | |
| Twinkle, Twinkle, Little Star p.10-11 | | Hop back to the top | D.C. al Fine Go back to the beginning and play until fine | ADVENTURE 6 | | | | Alligator Trap | Spooky Drum Fun | Swim, Bunny, Swim! Hold on Tight, Cat! | Skip a Rock, Skip a Finger | | | |
| | | Drum Pinky, Thumb, Lots Door & Double Drum | Perfect fifth accompaniment figure (ex. C C ) | p.30-33 | | Spooky Drum | Perfect fifth accompaniment figure in minor tonality contexts (ex. A A ) | ADVENTURE 12 | | | |
| ADVENTURE 2 | | | | Alligator's Chomp, Bunny's Escape; p.22-33 | | Alligator Chomp | An accented note | | | Helicopter Hands | Each hand hovers above the keys while not in play |
| Good Morning, Good Night p.12-13 | f | Forte | Play loudly | | | SHH! | ♩ Quarter Rest = 1 beat of silence | Jack Be Nimble; p.67 | | Skip a Note | Leaping at 3rd intervals |
| | p | Piano | Play softly | | | Running Notes | 𝅘𝅥𝅮 Eighth Notes = ½ beat for each | | | Slide up (as above) | Stepwise motion, as in a scale |
| Magic Finger Walk p.14-15 | | Come Back | Continue in the opposite direction to finish | ADVENTURE 7 | | | | p.67 | | Mustache | 𝄻 Whole Rest = Silence for the whole measure |
| | | Proud & Tall | Hand structure and position: thumb, pinky and elbow | Giraffe's Swing, Messy Froggy; p.36-37 | | All Five Fingers | Right or left hand uses all 5 fingers to play its melody | ADVENTURE 13 | | | |
| | Flip! | Flip | Invert the role of each hand, i.e. melody and Drums | | | Hot | 𝄼 Half Rest = 2 beats of silence | Sunrise Party, Skip to My Lou, Yankee Doodle, Wheels on the Bus; p.72-75 | | Section Stretch | Every melody note within this section is accompanied by a Stretch Drum |
| ADVENTURE 3 | | | | ADVENTURE 8 | | | | | | Laughing Note | Staccato articulation - quickly released |
| p.18-20 | | Good Morning, Good Night, with Flip! | | Kicking Song, Jumping Song; p.40-41 | | Kicking Pinky/Thumb | Position shifting through finger substitution: 5-1 or 1-5 | | | Share | The melody note overlaps with the top note of the Drum |
| | | Thumbs are Buddies | Rain, Rain | | | Jumping Pinky/Thumb | Position shifting through leaping and continuing with either the pinky or thumb | | | Flying Pinky | Only the thumb side of the Drum plays |

SYSTEM AND METHOD FOR TEACHING PIANO AND NOTE READING

CROSS-REFERENCE TO RELATED APPLICATION

This application claims the benefit of U.S. Provisional Patent Application Ser. No. 62/979,630, filed Feb. 21, 2020, the entirety of which is incorporated herein by reference.

NOTICE OF COPYRIGHT AND TRADEMARK RIGHTS

A portion of this patent application disclosure contains material that is subject to copyright protections. This patent application may show and/or describe subject matter that is or may become a trademark and/or trade dress of the owner. The copyright, trademark and trade dress owner has no objection to the facsimile representation by anyone of the patent application disclosure, as it appears in the U.S. Patent and Trademark Office patent files and records, but otherwise reserves all copyright, trademark and trade dress rights.

FIELD

The present application relates generally to a system and method for teaching children in the field of music, and more particularly to teach children to play the piano and read musical notes using a method having specific characters assigned to fingers and specific animals assigned to musical notes, all with assigned colors, and all incorporated within themed environments presented in continuing stories.

BACKGROUND

Numerous systems, books and aids have been used for teaching children to play musical instruments and to learn to read musical notes. The incorporation of toys, cards, rewards, games or other aids into such educational programs to engage young children and encourage the learning of desired skills is a common practice. A detailed discussion of various approaches to prior musical education systems is set forth, for example, in U.S. Pat. No. 6,057,501 and 10,332,415.

While many of the prior systems described are able to teach and engage some children, they may not have engaged young children in a way that continues to capture the attention of many young children, or children with disabilities, over a period of time sufficient to enable successful skill development.

SUMMARY

The present application provides a method for teaching children to play the piano and read musical notes using animals assigned to and representative of specific musical notes, including having an assigned color and/or shape. Additionally, the system and method features characters assigned to the fingers of the hand, and finger puppets, rings or stickers/tattoos that may be worn by a child to represent and remember the characters. The use of specific animals, characters and environments, which may be provided as physical objects bearing images of the animals and characters and collected by the child, or given as rewards, are provided for use supported on or adjacent the assigned piano keys. The animals, environments and characters are incorporated within representative and continuing stories, told or demonstrated to the child using a presentation medium such as books, a display associated with a computer or computer enabled devices, for example, including a laptop or tablet, or may be told live or in person. The presentation medium materials may include a method "book," a homework "book," a performance "book" and a "book" of scales. Using the animals, characters, environments, physical objects bearing images of these, and the continuing stories of the present application, young children are taught specific notes, piano keys to play, fingers to use, musical notation, and proper techniques to use.

DESCRIPTION OF THE DRAWINGS

The patent or application file contains at least one drawing executed in color. Copies of this patent or patent application publication with color drawing(s) will be provided by the Office upon request and payment of the necessary fee.

The system and method for teaching music, and making using of animal figures assigned to specific musical notes, and characters assigned to specific fingers, within environments presented in a continuing series of stories demonstrated for the child using a presentation medium, may be better understood by reference to the following descriptions of the attached drawings, which may be images from presentations materials used with the system and method, such as books.

FIGS. 2 and 3 schematically illustrate the 7 animals as they could be depicted engaged or supported on their representative 7 notes and respective piano keys.

FIG. 11 schematically illustrates proper form of the child's hands supporting the Boss Thumb toy character indicia, the Queen Pinky finger toy character indicia, and the location of an Elbow's Eye toy character indicia to illustrate the proper body position of the child while playing the piano.

FIG. 17A illustrates the progression of piano playing and note reading using another of the continuous series of birthday parties in the presentation medium, specifically the dog (note D) is having a birthday party and a blue birthday cake is provided on note D.

FIG. 17B illustrates another or a next progression of piano playing and note reading in the presentation medium, where the specific fingerings (including some finger characters) are illustrated adjacent the images of the animals representing the notes of the D scale and the blue theme continues.

FIG. 17C illustrates another or a next progression of piano playing and note reading in the presentation medium, where the specific fingerings and images of the animals from FIG. 17B are continued, and the relevant notes of the piano keyboard are also schematically illustrated with images of the animals representing the notes of the D scale positioned on the piano keys to be played by the left and right hands, and the dog's blue birthday party theme continues.

FIG. 17D illustrates another or a next progression of piano playing and note reading in the presentation medium, where the specific fingerings from FIGS. 17B and 17C are continued and located on the relevant keys of the piano keyboard to be played by the left and right hands, and the image of the dog animal representing the starting note of the D scale is shown with the physical token as it would be positioned on the relevant piano keys, and the dog's blue birthday party theme continues.

Figure 18:
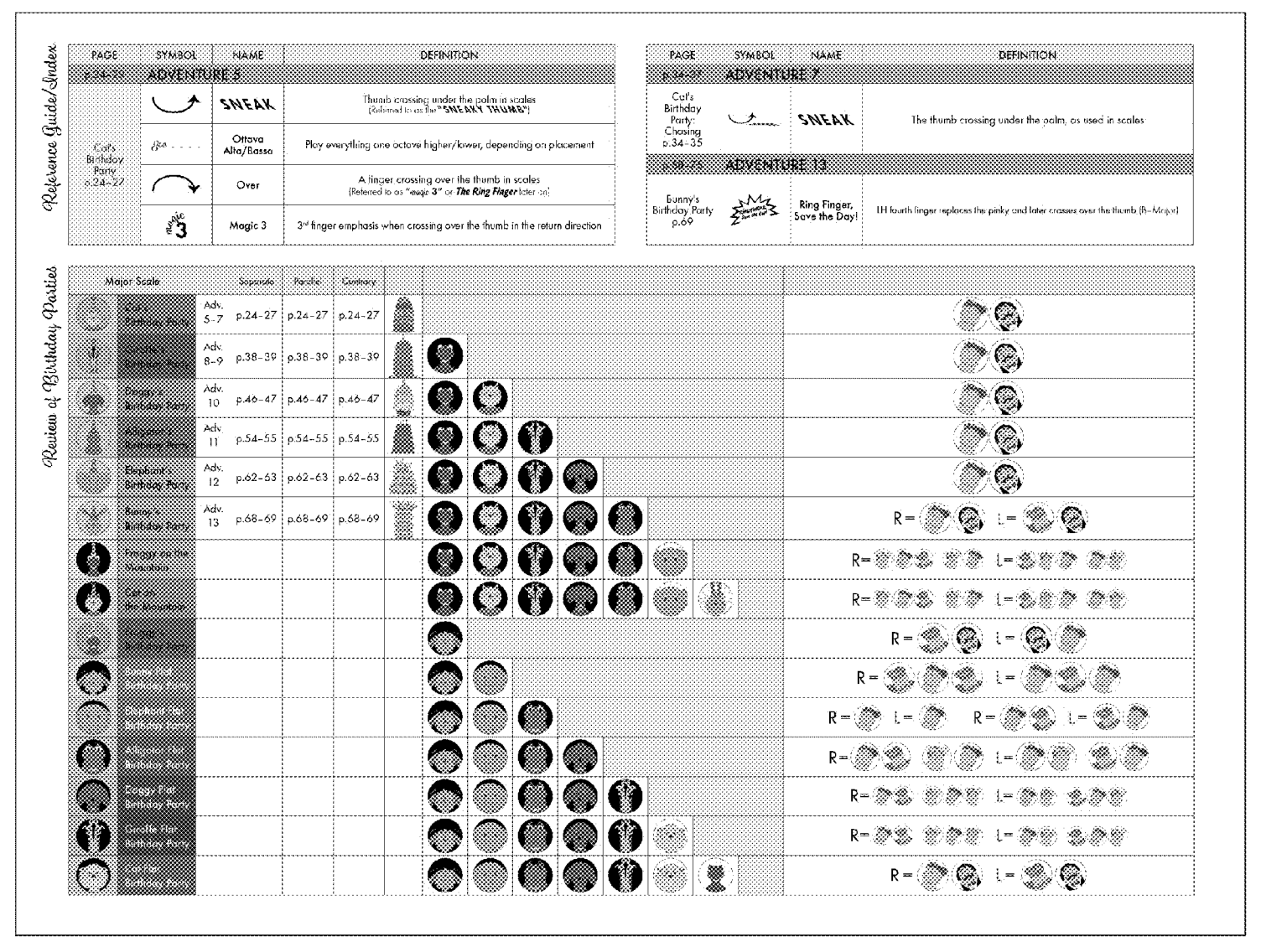

FIG. 18 illustrates key charts from the presentation materials used to demonstrate the birthday party environment in the series of continuing stories or adventures which represent scales and skills being taught, which animals represent the assigned notes, the color coded birthday cakes, and the characters assigned to the fingers to be highlighted for each scale.

FIG. 20A illustrates a sheet of stickers bearing images of additional representative symbols, which symbols may also be represented as physical tokens, toys, charms, rings, or other items bearing an image of the respective symbols.

FIG. 24 illustrates a key used to demonstrate the symbols assigned to represent various musical notation and features within the series of continuing stories or adventures, which symbols may be represented by physical objects bearing an image of the symbol.

It is noted that the foregoing depictions make it apparent that a variety of applications and combinations of the present system and method are possible once various configurations are disclosed and described.

DETAILED DESCRIPTION

Figure 1:
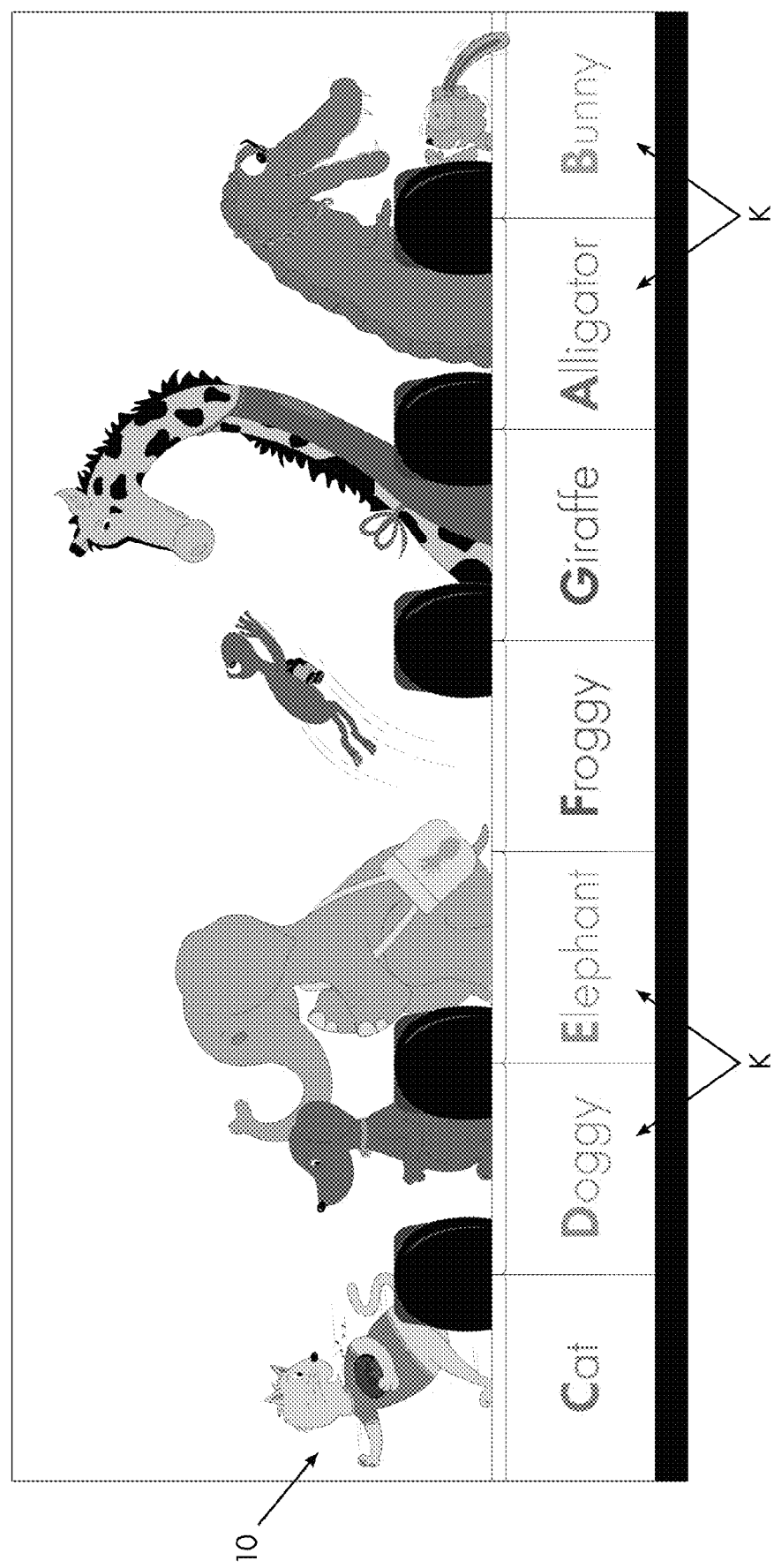
FIG. 1 schematically illustrates seven (7) notes of a musical scale depicted on piano keys with a specific animal and color assigned to each note.
Figure 4:
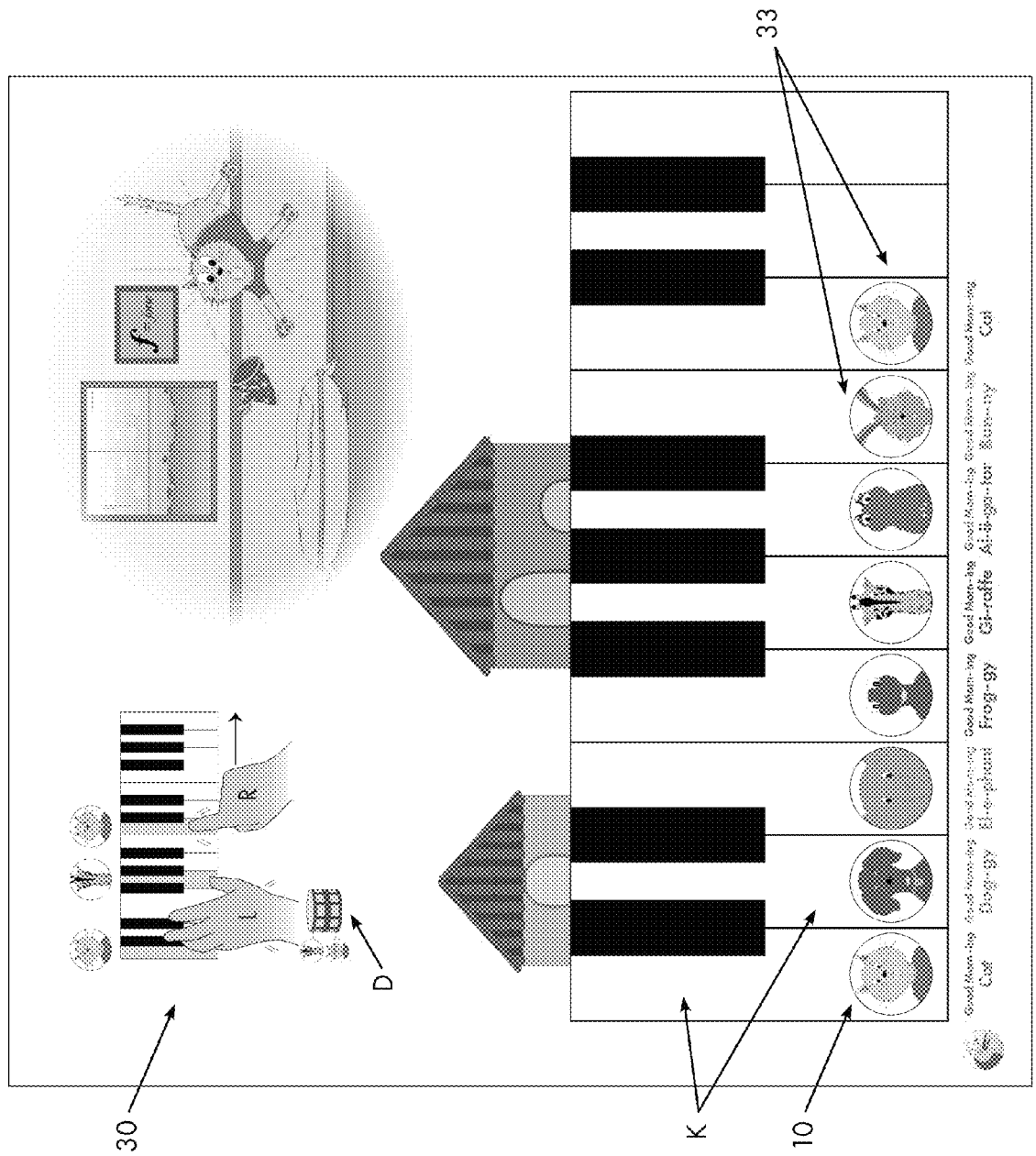
FIG. 4 schematically illustrates a piano keyboard supporting an alternate embodiment of the animal images and their associated colors as stickers or other non-marking indicators supported on the notes for their representative 7 piano keys.
Figure 4B:
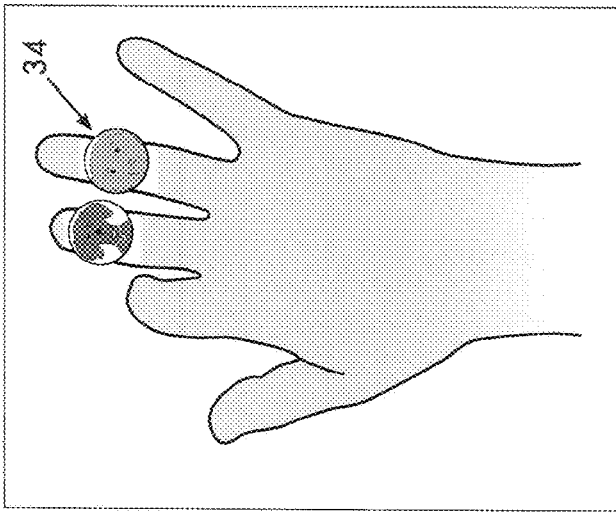
FIG. 4B schematically illustrates four of the "seven little wanderers" or the animal images adjacent a two door animal house adjacent notes F (frog), G (giraffe), A (alligator) and B (bunny) where stickers or other non-marking indicators are supported on the notes representing their respective piano keys.
Figure 4A:
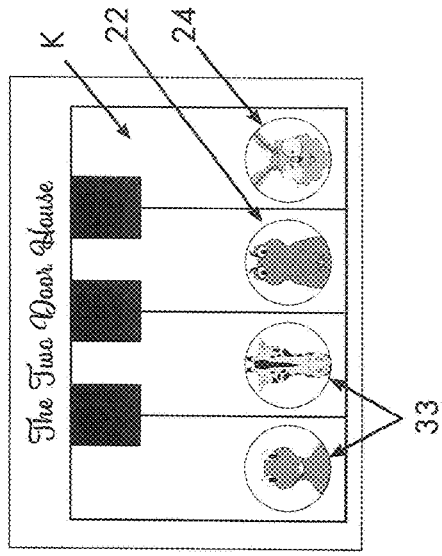
FIG. 4A schematically illustrates three of the "seven little wanderers" or the animal images adjacent a one door dog house adjacent notes C (cat), D (dog) and E (elephant) where stickers or other non-marking indicators are supported on the notes representing their respective piano keys.
Figure 4E:
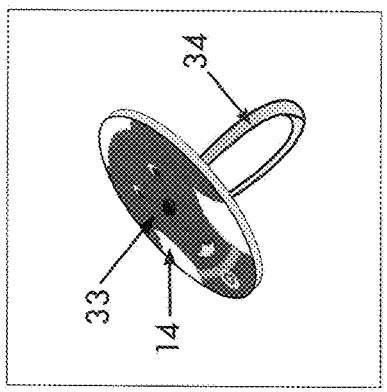
FIG. 4E schematically illustrates rings displaying the images of a dog (for note D) and an elephant (for note E) being worn on the relevant fingers of a child learning to play the musical notes represented.
Figure 4D:
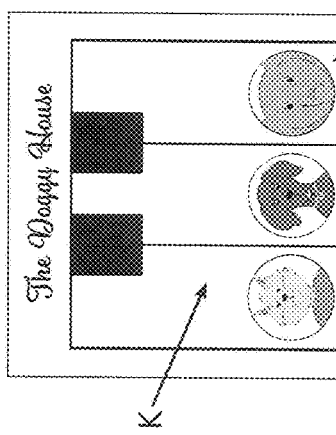
FIG. 4D illustrates a ring displaying an image of the dog with a blue collar representing the musical note D, which ring may be worn on the relevant finger of a child learning to play the musical note D.
Figure 4C:
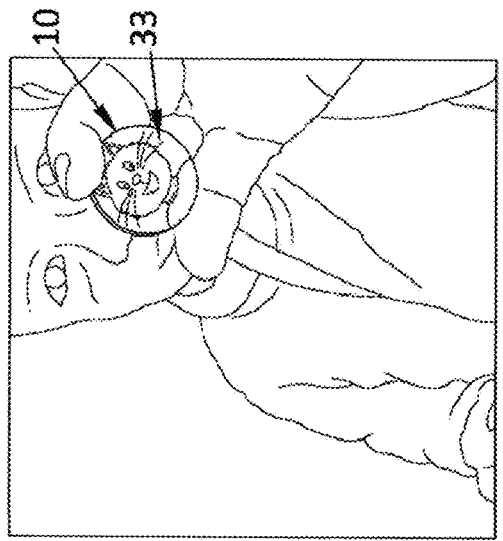
FIG. 4C illustrates a child with a physical object displaying an image of one of the seven little wanderers, in this image the token bears an image of the cat with an orange shirt representing the musical note C.

The present application provides a system and method for teaching piano and note reading. As shown in FIG. 1, the present system and method assigns a specific animal to each of the seven (7) notes of a musical scale. As depicted on each piano key K, a physical object 10 displaying or depicting the specific animal assigned to each note may be manufactured of appropriate materials. A specific color or shape may also be associated with each animal or note. The physical object 10 assigned to each musical note is a physical toy, token, charm or sticker, for example, displaying an image of the specific animal engaged or supported on the respective piano key. The materials may include any appropriate plastic material, paper materials, adhesive backed materials for stickers, or board materials, for example, Sintra® polymer board material, or other similar appropriate material. In FIG. 4, tokens, stickers, or other non-marking indicia, depicting the specific animal assigned to each note may be displayed, engaged or supported on their respective piano keys. As shown, the musical note C is depicted by a cat 12 and the color orange, the musical note D is depicted by a dog 14 and the color blue, musical note E is depicted by an elephant 16 and the color grey, musical note F is depicted by a frog 18 and a bright green color, musical note G is depicted by a giraffe 20 and the color purple, musical note A is depicted by an alligator 22 and a military green color, and musical note B is depicted by a bunny 24 and the color pink.

By presenting the specific animals depicted as musical notation through a presentation medium 30, such as books or screens of electronic devices, a series of continuing stories are used to expand a child's musical education and keyboard abilities. For example, a series of continuing stories or adventures for teaching musical scales uses a birthday party theme. For each specific animal assigned to each musical note, a physical object may be used which displays an image of a birthday cake with an assigned specific color and shape consistent with the continuing story of the animals. The toy 37, token 33 or other physical object 10 displaying the image of the colored birthday cake, coordinated with the color of the note or scale, is engaged on or adjacent the last note of a scale to be played by a child, and identifies the last note of the scale being played by the child.

Figure 6:
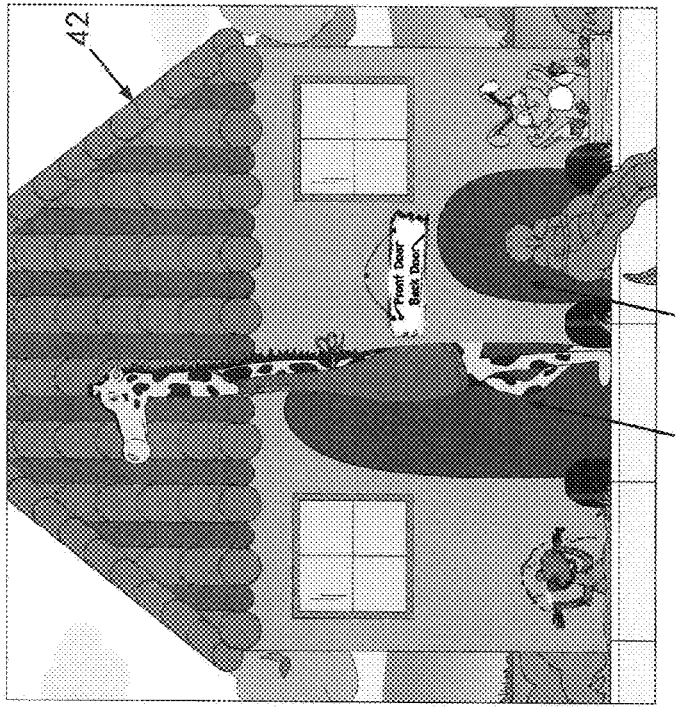
FIG. 6 schematically illustrates the two door animal house positioned adjacent the 3 black keys.
Figure 5:
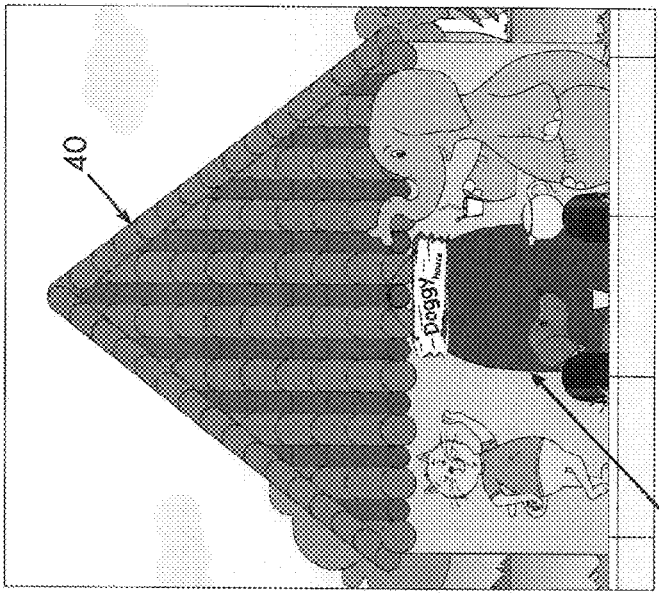
FIG. 5 schematically illustrates a dog house with a single door positioned adjacent the 2 black keys.

For the purpose of teaching musical notes a continuing story involving the animals and an animal house may also be used as a theme. A physical object displaying an image of the animal house is supported on or immediately adjacent the black keys of a piano keyboard for teaching the location of black keys on a piano keyboard and the surrounding notes. A single door dog house 40, where the musical note D and the dog are positioned between the two black keys is shown in FIG. 5. A two-door animal house 42 where the musical note G and the giraffe are depicted between two of the three black keys, and the musical note A and the alligator are depicted between the other two of the three black keys, is shown in FIG. 6. It should be understood that the images within the Figures may be images used within the presentation materials, or as shown in FIG. 7, the images may be displayed on actual physical houses 40, 42 used by the child and/or the piano teacher, and which are associated with the piano keyboard as teaching tools.

Additionally, a continuing story involving the animals "on the mountain" or sitting on a black key, is also used to instruct the child regarding musical notes and notation, and the playing of the black keys. In the presentation materials, shown in FIGS. 14 to 17, the image of the animal (the green frog) is changed to include sunglasses when the animal is "on the mountain"—meaning a black key is played. The physical object may also be changed to display an image of the animal with binoculars. In this manner, the G scale is taught, and as in FIG. 14, the purple birthday cake continues the environment of the giraffe's birthday party, and the purple birthday cake is positioned on the first or last note of the G scale, the note G.

An alternate embodiment of the animal images shown supported on the notes of the piano keys, and an introduction to the drum or chord representative symbol is shown in FIG. 4. The left hand (indicated with a red letter "L") is shown playing the notes G and C or a regular shaped drum image or symbol for a chord, and the right hand (indicated by the black letter "R") is shown playing the note C. The cat animal is shown in an exaggerated condition to demonstrate the loud sound of the C note being played, along with the musical term "forte" and the musical notation "f" to begin associating physical sounds with musical notation. A similar demonstration method is used with the cat character shown sleeping quietly to demonstrate the musical term "piano" and the musical notation "p" to associate this physical sound level of the note C. A cat animal and the other animal and characters, either sleeping or in exaggerated positions or other positions, may be used to teach and remind the student/child of the musical notation being taught, for example rests and sound levels.

Figure 7:
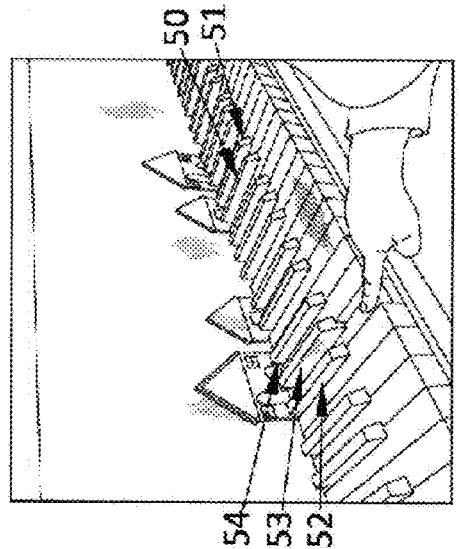
FIG. 7 illustrates the dog houses and two door animal houses of FIGS. 5 and 6, where the physical objects are shown positioned on or adjacent the relevant piano keys along the keyboard.

FIGS. 4A, 4B and 5 to 7, illustrate the environment of a dog house with a single door 41 positioned between the 2 black keys. The dog house 40 is positioned with the door 41 adjacent the piano key for the note D to associate the note D and the dog animal with the note position between the group of 2 black keys at the door 41. The cat and elephant animals are shown positioned on their assigned notes adjacent note D and the dog animal. The dog house 41 may be a plastic or paper house capable of being positioned at the location behind the keys as shown in FIG. 7, with an image of a door 41 opening for the dog animal. The dog house 40 is approximately 2.5 inches tall, approximately 2.3 inches wide, and approximately 6 mm thick, with two openings 20, 21 formed to engage around the group of 2 black keys. The black key openings 50, 51 are approximately 0.45 inches wide and 0.375 inches tall.

In FIG. 6, the two door animal house 42 is shown positioned adjacent the group of 3 black keys, and includes an image of one taller door 43 adjacent the piano key for the note G to associate the note G with the giraffe animal. A second shorter image of a door 44 is positioned adjacent the piano key for the note A to associate the note A with the alligator animal. The animals may be shown or positioned on their respective assigned key notes. The frog and bunny toy animals are also shown positioned on their assigned F and B keys/notes, respectively. The two door animal house 42 may be a plastic or paper house capable of being positioned at the location behind the black keys as in FIG. 7, with images of two door openings 43, 44 aligned as shown for the G and A note animals. The two door animal house 42 is approximately 3.6 inches tall, approximately 3.47 inches wide, and approximately 6 mm thick, with three openings 52, 53, 54 formed to engage around the group of 3 black keys, which black key openings are approximately 0.45 inches wide and 0.375 inches tall.

Figure 8:
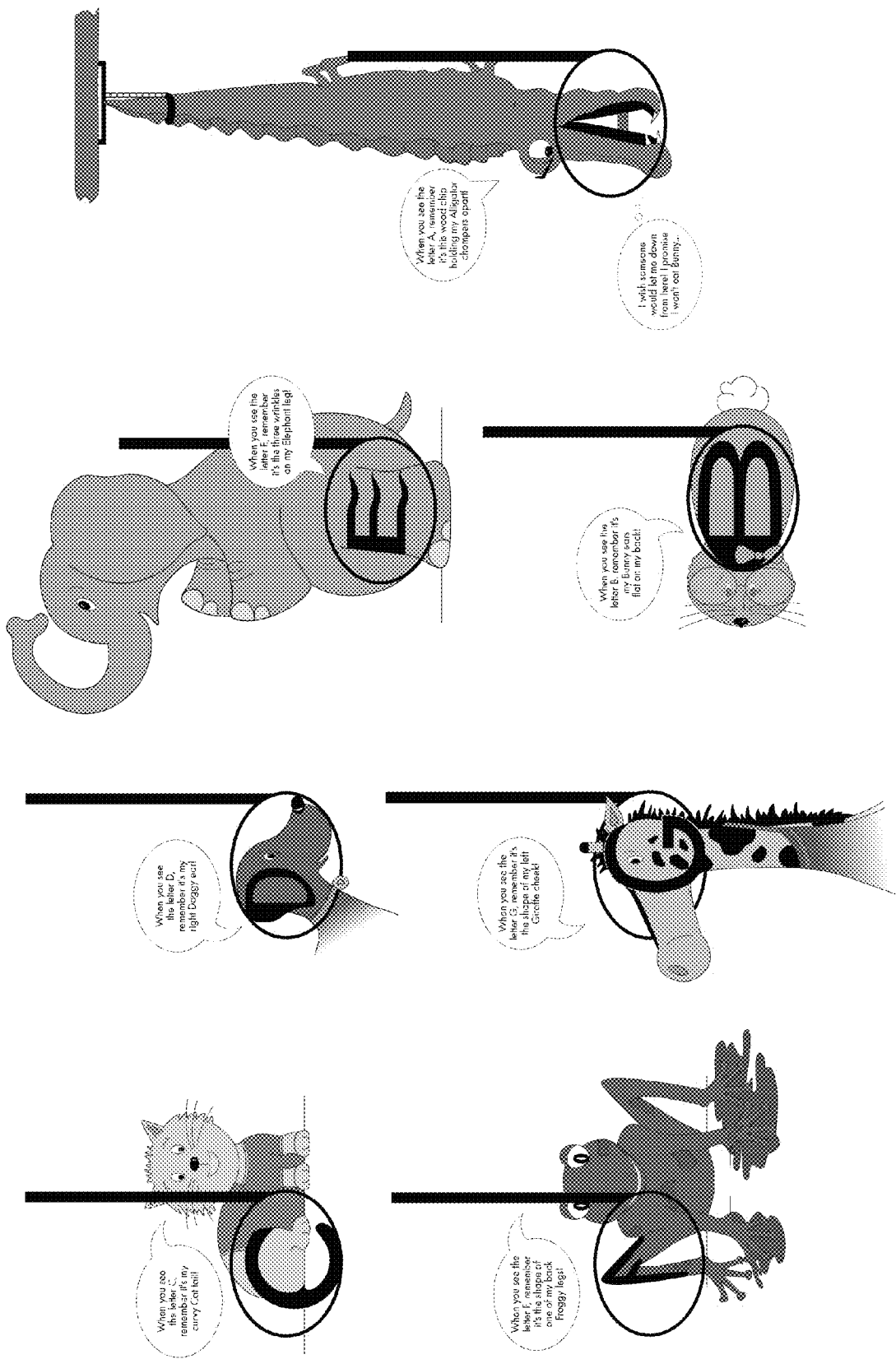
FIG. 8 illustrates the 7 notes as represented by their assigned animals.
Figure 8A:
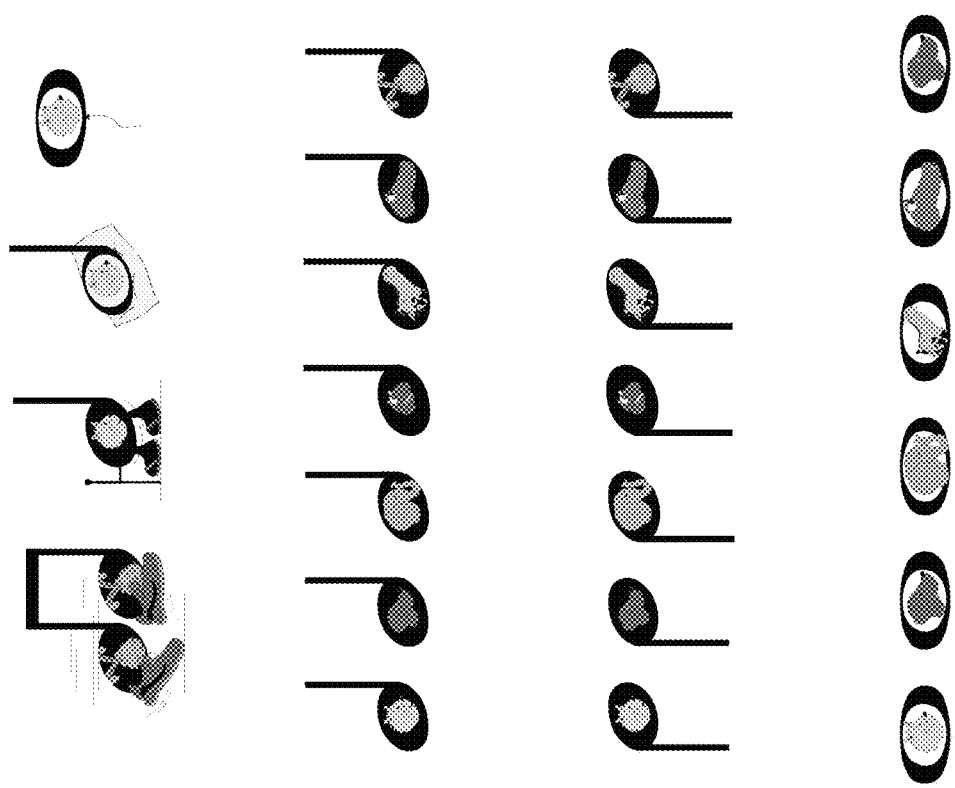
FIG. 8A illustrates a further use of the 7 musical notes with images of the assigned animals displayed within the notes, which may be used with students as they advance through the presentation materials of the system and method and their musical note reading skills advance.

FIGS. 8 and 8A illustrate various representations of the 7 musical notes used with the present system or method including or associated with their respective animals. The shape of the letter of the alphabet may be positioned within the body or specific body part of the animal, as the shape of the letters could be represented to the child in the presentation medium, and also represented within the physical object of the animal character to teach the letters and remind the child of the shapes associated with each animal and note.

Figure 9:
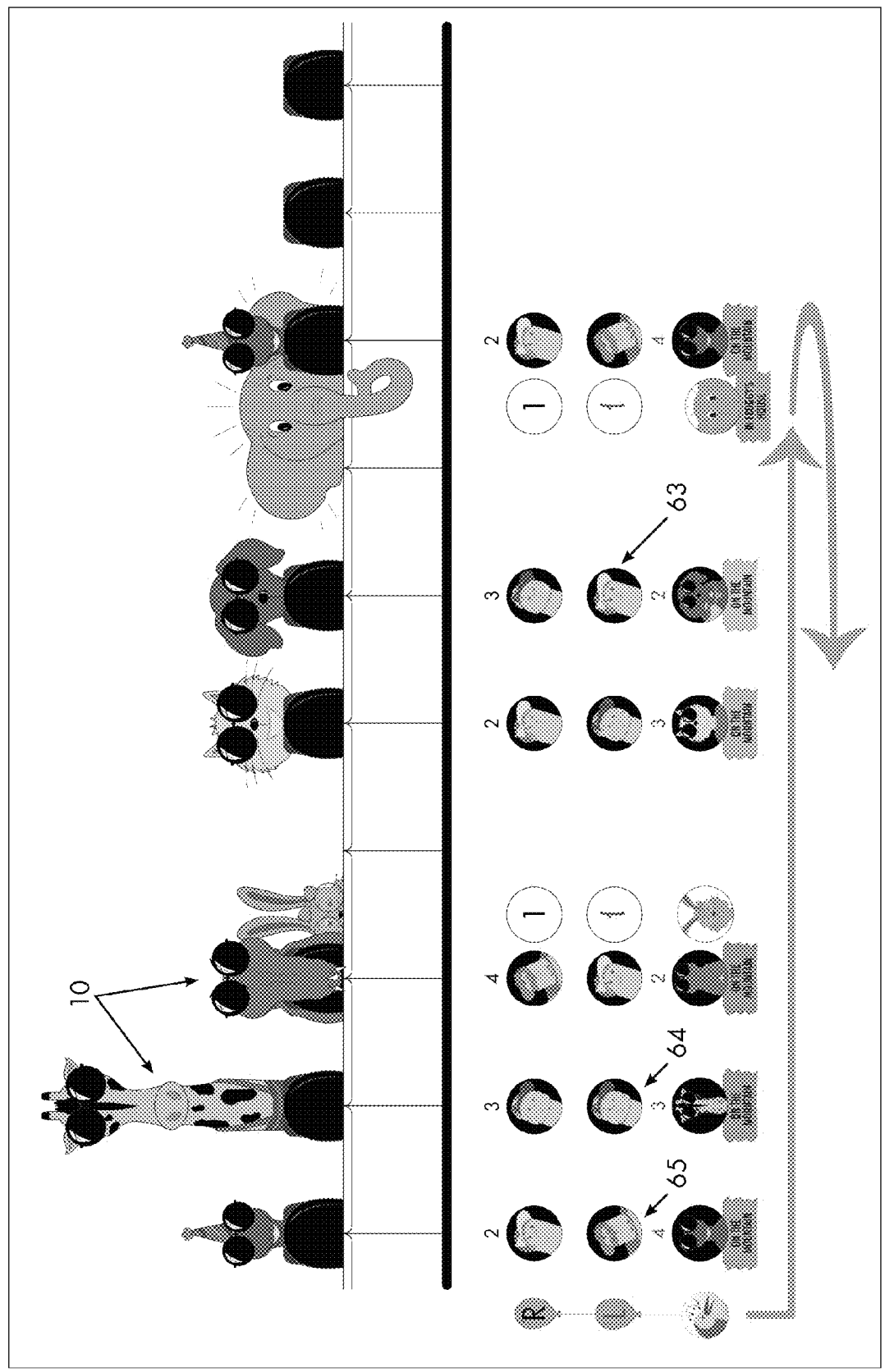
FIG. 9 illustrates some of the animals wearing sunglasses or using binoculars, which is an additional alternate form of the physical objects or animals, which may be provided for the child to indicate that the note or toy animal is "on a mountain" or meaning the finger is now on or to be playing the indicated black key.

As the student becomes more advanced in playing the piano and note reading, alternate forms of the animals are used to indicate that the notes are sharp or flat. In FIG. 9, the animals wearing eyewear such as sunglasses or using binoculars, are used to indicate that the animal is "on a mountain" or meaning the finger is now on or to be playing the indicated black key, which is a sharp of the note. In alternate images of the animals with "flat" ears, or ears in a downward position, are used to depict when the finger is now on or to be playing the indicated black key, which is a flat of the note. The physical objects 10, when they are toy animals 37 may be adapted with a base or adhesive sufficient to enable engagement on the top surface of the black notes of the piano keys. Alternatively, a token 33 or sticker 35 may be used bearing the images so that the physical object is adapted to be retained on the black key while the key is being played. In addition to animals with sunglasses, binoculars or other eyewear provided to indicate a black key, a theme including physical "On the Mountain" signs of the type illustrated as rustic, or quasi-old wooden signs may also be provided, and which are the signs, each having the correct note name and associated color, to place on the appropriate black keys for a music theory exercise.

Figure 10:
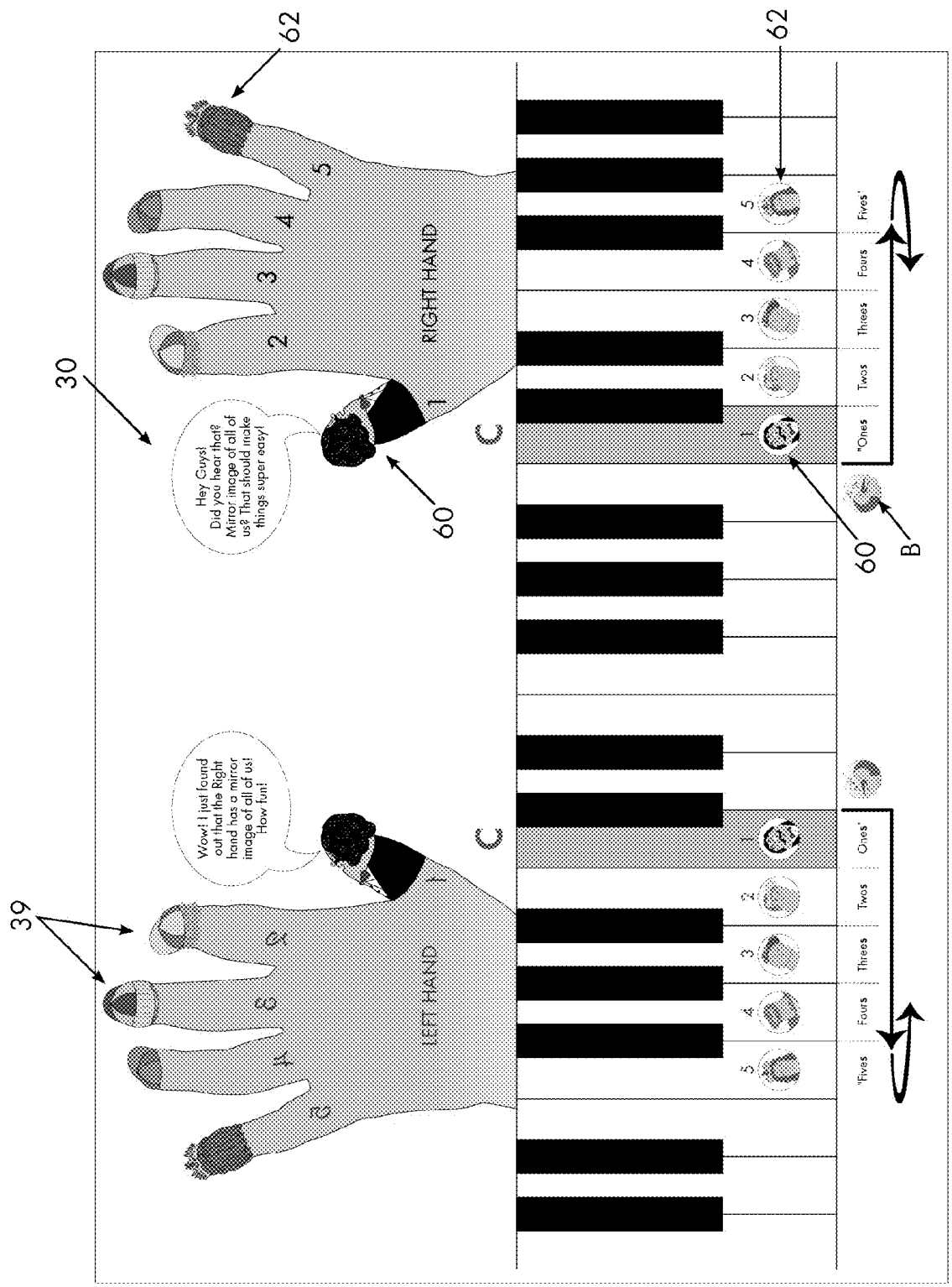
FIG. 10 schematically illustrates the child's hands supporting the images of the characters, as well as a presentation of characters on the piano keyboard.

To instruct the child regarding the fingers to be used to play each note or key, characters are assigned to the fingers of each hand—Boss Thumb 60, Queen Pinky 62 and three friends 63, 64, 65. The first of the three friends is shown as an index figure (finger 1), and is designated as a boy with a green and yellow baseball cap 63. The second of the friends (finger 2) is shown as the middle finger, and designated as a girl with a purple cap 64. The third friend is shown as a ring finger (finger 4), and designated as a boy with a teal green and orange cap perhaps with an orange facemask 65. The characters may be provided as any 3 friends wearing any designated headgear or other identifying indicia, and are used to assist the child with identification of the desired and indicated fingers. Physical objects 10 bearing images of the characters may be removably applied to the child's fingers using rings 34 (which may use hard plastic or a stretchable nylon band attached to a token), stickers 35, finger puppets 39, removable "play" tattoos 38 or other water washable and removable indicia showing the characters on the relevant fingers. It is noted that the images of the characters are not intended and do not interfere with application of the child's fingers to the piano keys or playing of the instrument. In FIG. 10 the child's hands are shown supporting the images of the characters, as well as a presentation in the instructional medium of the piano keyboard supporting the images as they may be presented to the child using the removable indicia and in the presentation medium. It is noted that a singing bird symbol B may also be used to instruct the child to sing along with the notes being played.

Figure 11B:
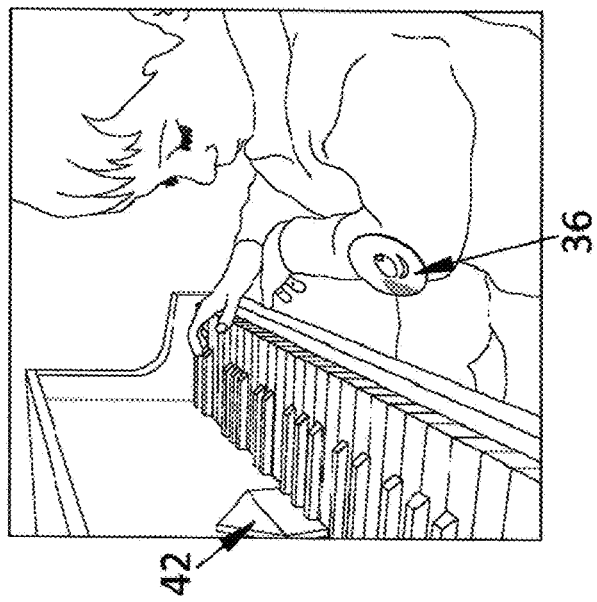
FIG. 11B illustrates a child wearing an armband supporting the "elbow eye" character image.
Figure 11A:
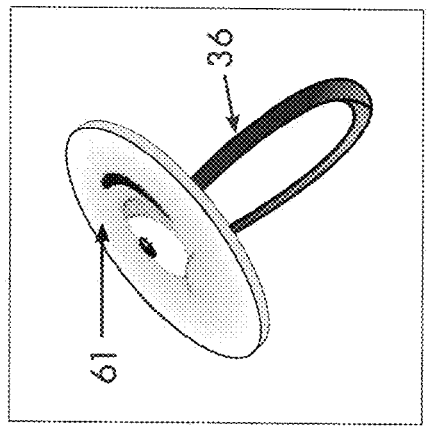
FIG. 11A schematically illustrates an armband supporting an image of the "elbow eye" character.
Figure 12:
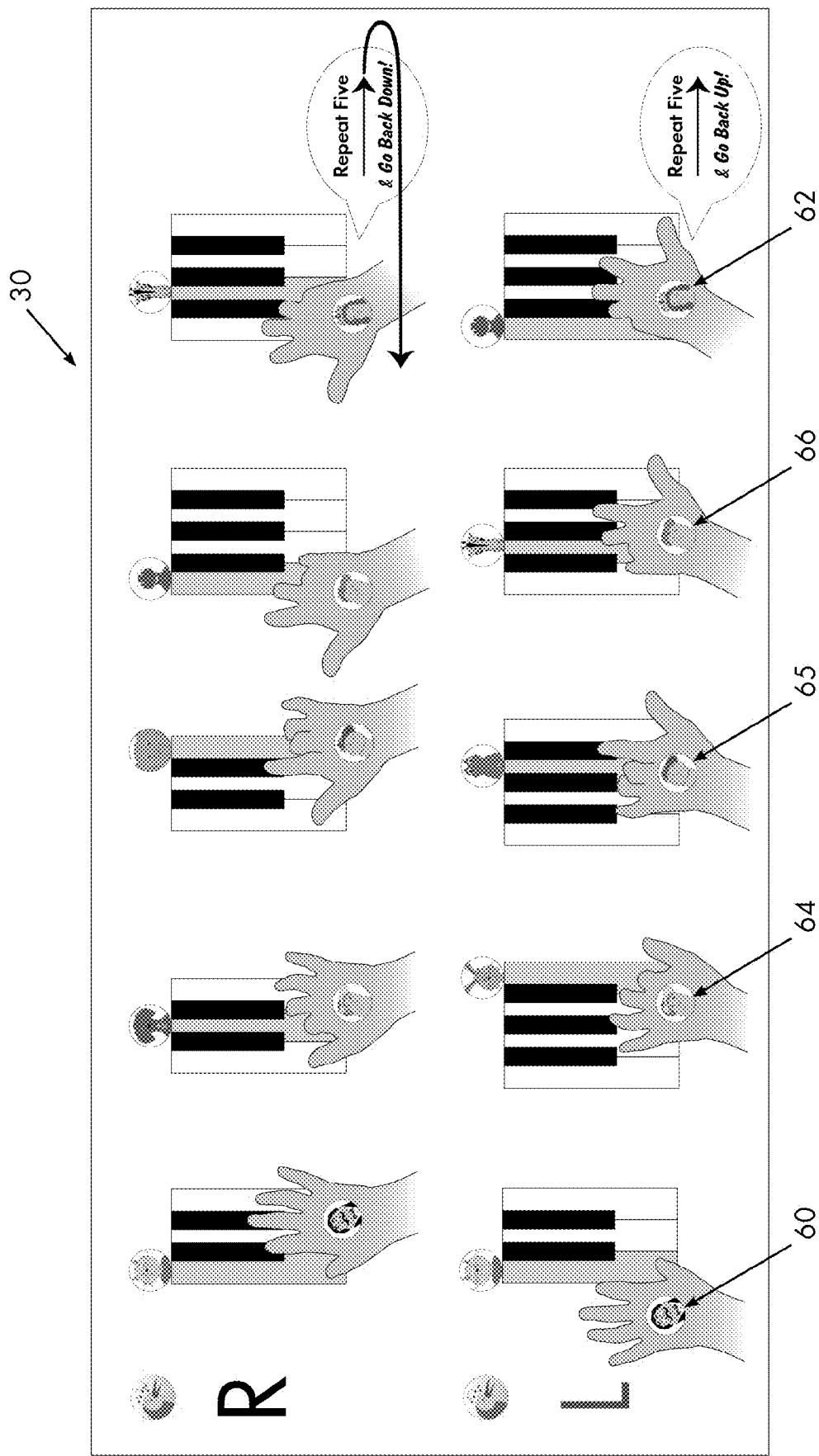
FIG. 12 schematically illustrates the presentation medium demonstrating the position of the hands and fingers to be used playing a simple scale on the piano, which fingers are shown associated with the assigned characters.

In addition to use of the proper finger, shown in FIG. 12, the assigned characters are intended to illustrate the proper form of the child's hands during playing of the piano. For example, the Boss Thumb 60 character, the Queen Pinky 62 finger character, and the location of an Elbow's Eye 61 character are all intended to illustrate, as in FIGS. 11 and 11B, the proper body position of the child as "proud and tall" while playing the piano. In FIG. 11, an armband 36 is shown with a nylon band attached to a token displaying an image of the elbow's eye 61 character, which is also shown worn by a student in FIG. 11B. It should be understood that the physical objects of the characters, Queen Pinky, Boss Thumb and Elbow's Eye may be provided as images having a variety of skin tones.

Figure 13:
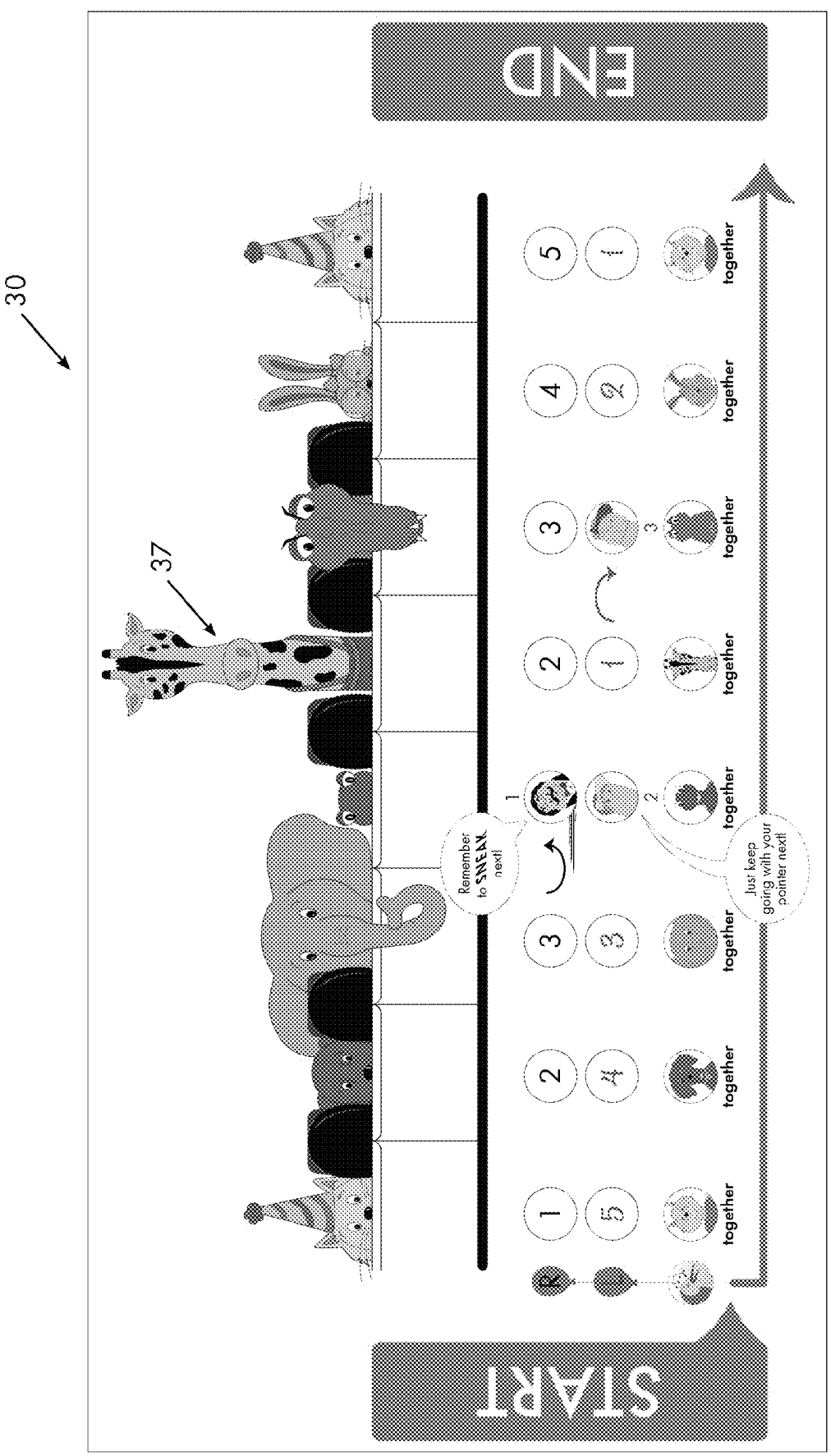
FIG. 13 schematically illustrates the physical animals positioned on their assigned keys during play of a one octave scale beginning with middle C colored orange, where the illustration from the presentation materials also includes the indicated hands and fingers to be used, and a song to be sung by the student.

FIG. 13 schematically illustrates the physical toy animals positioned on their assigned keys during play of a one octave scale beginning with middle C, where the illustration also includes the indicated hands and fingers to be used, and the song to be sung by the student.

Figure 14:
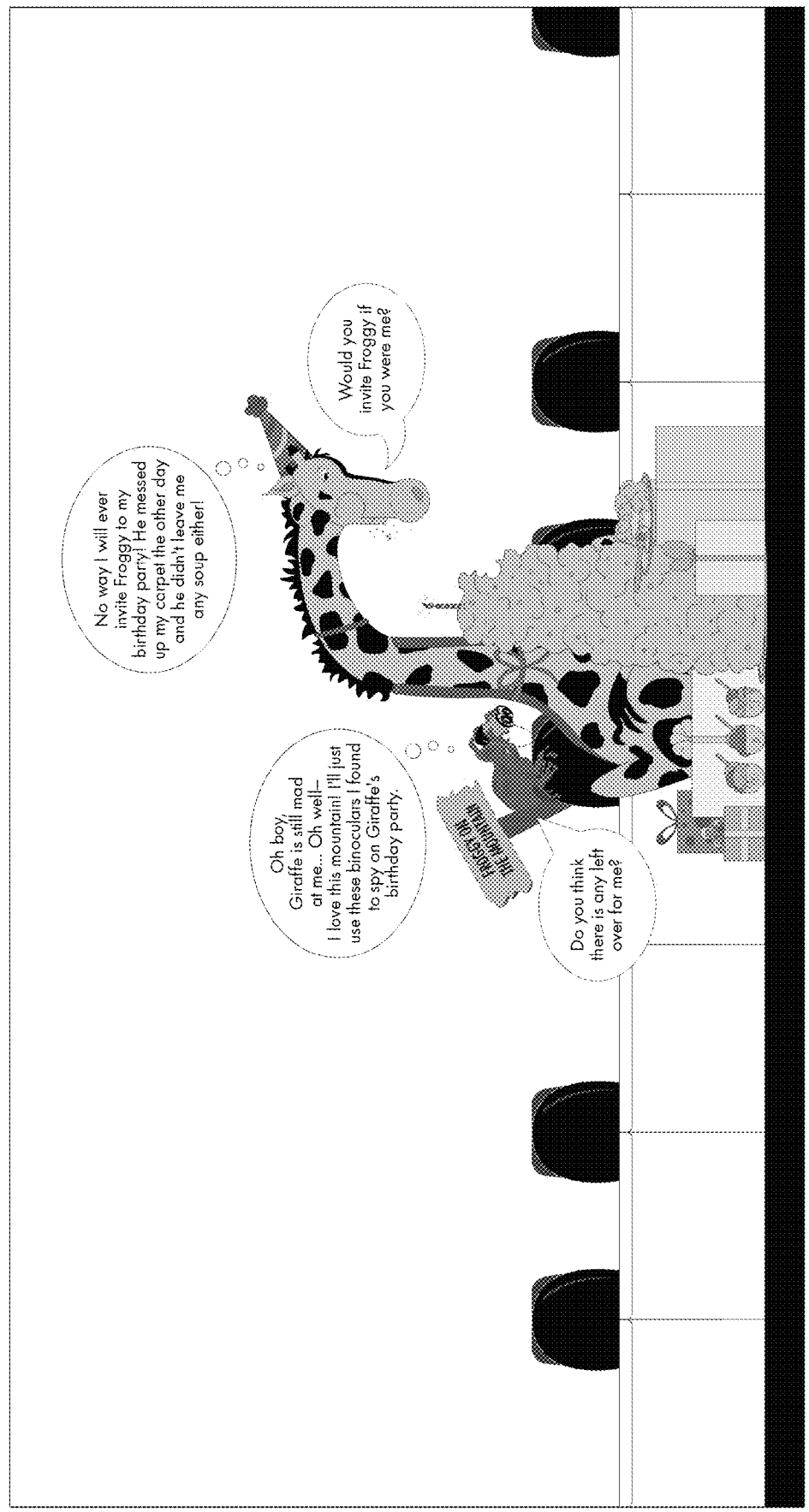
FIG. 14 is an illustration of the presentation medium, which describes one of the seven animals having a birthday party. The continuous series of birthday party themed stories, one for each note or animal having a specific color, provides the basis for instruction of all of the musical scales.
Figure 15:
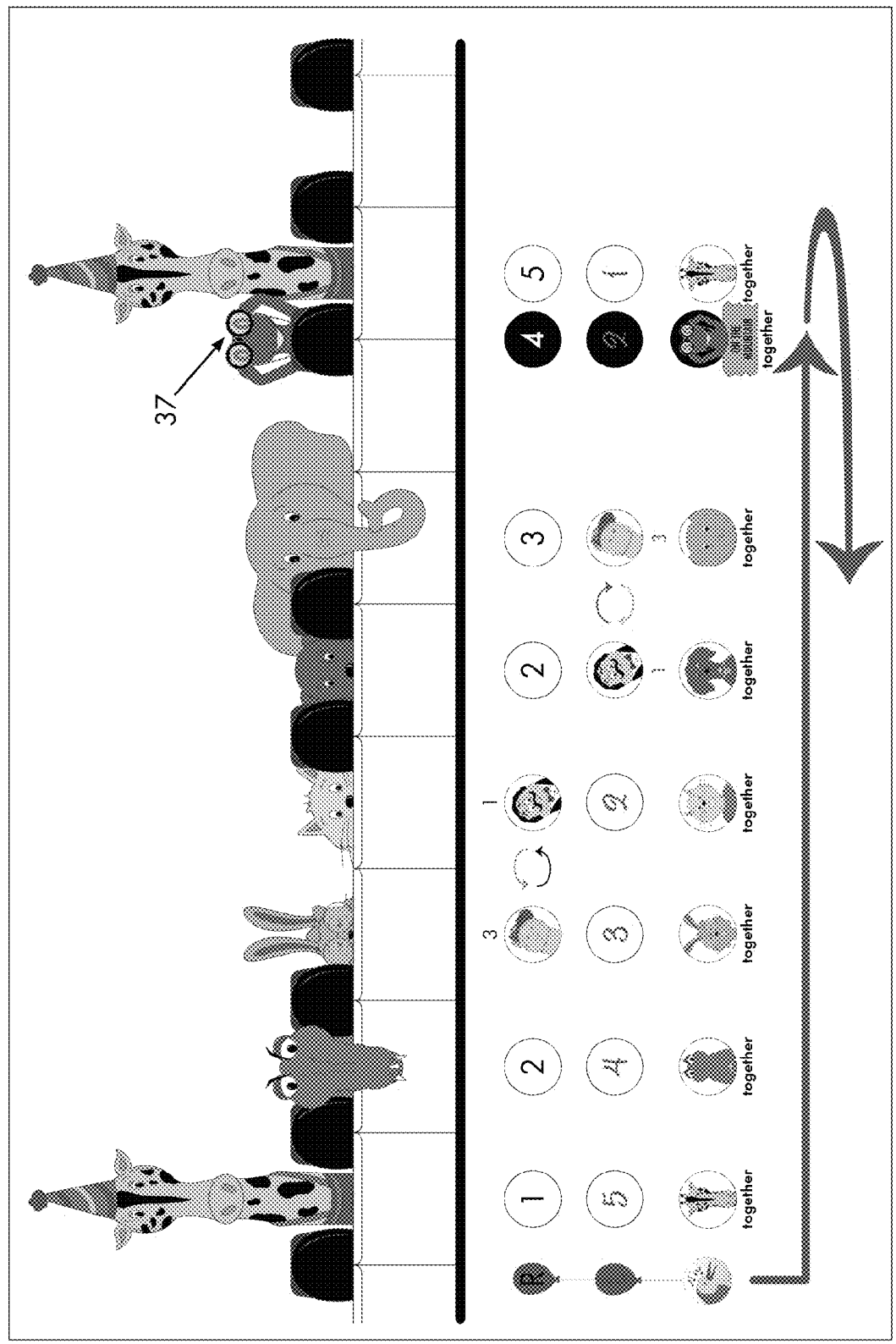
FIG. 15 is a further reinforcing illustration from the presentation medium of the scale of FIG. 14 purple giraffe birthday party story, and showing the keyboard and with the assigned fingers for playing the giraffe scale.
Figure 16:
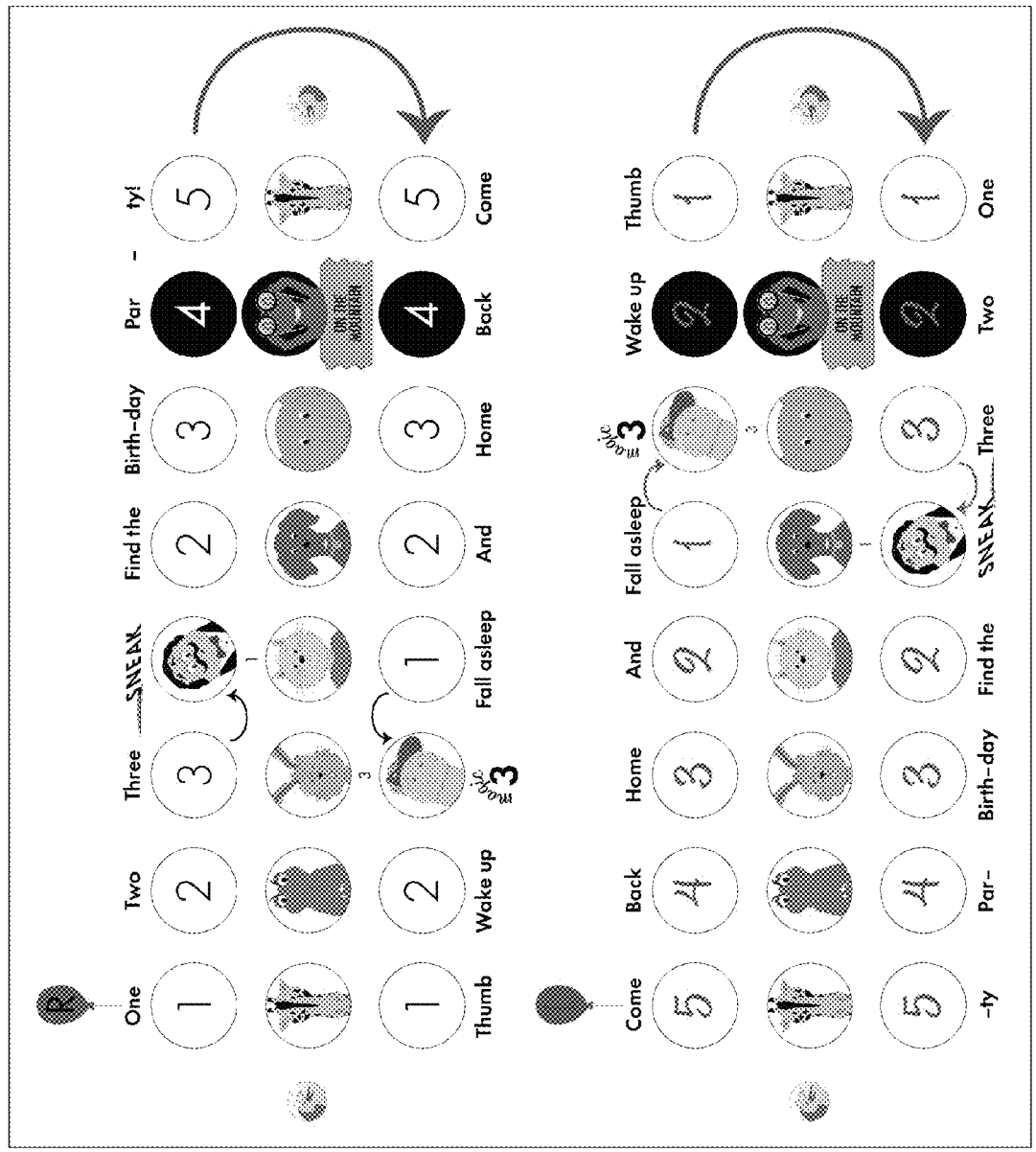
FIG. 16 is a reinforcing illustration from the presentation medium that illustrates the scale shown in FIG. 15, but with additional repetitions.
Figure 17:
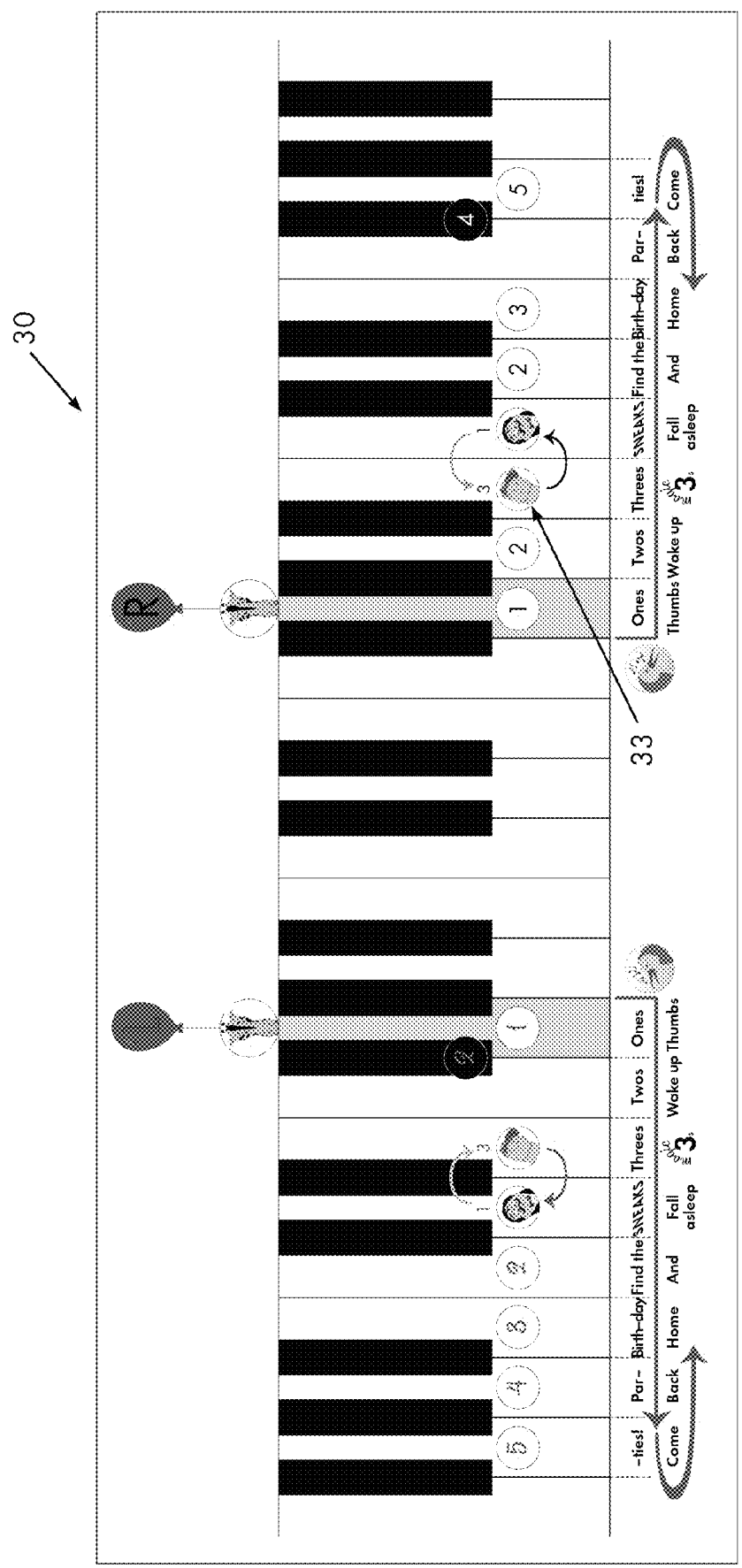
FIG. 17 is a still further reinforcing illustration from the presentation medium of the scale of FIG. 14 and showing the keyboard and with the assigned fingers for playing the purple giraffe scale, including alternate words for singing.
Figure 19:
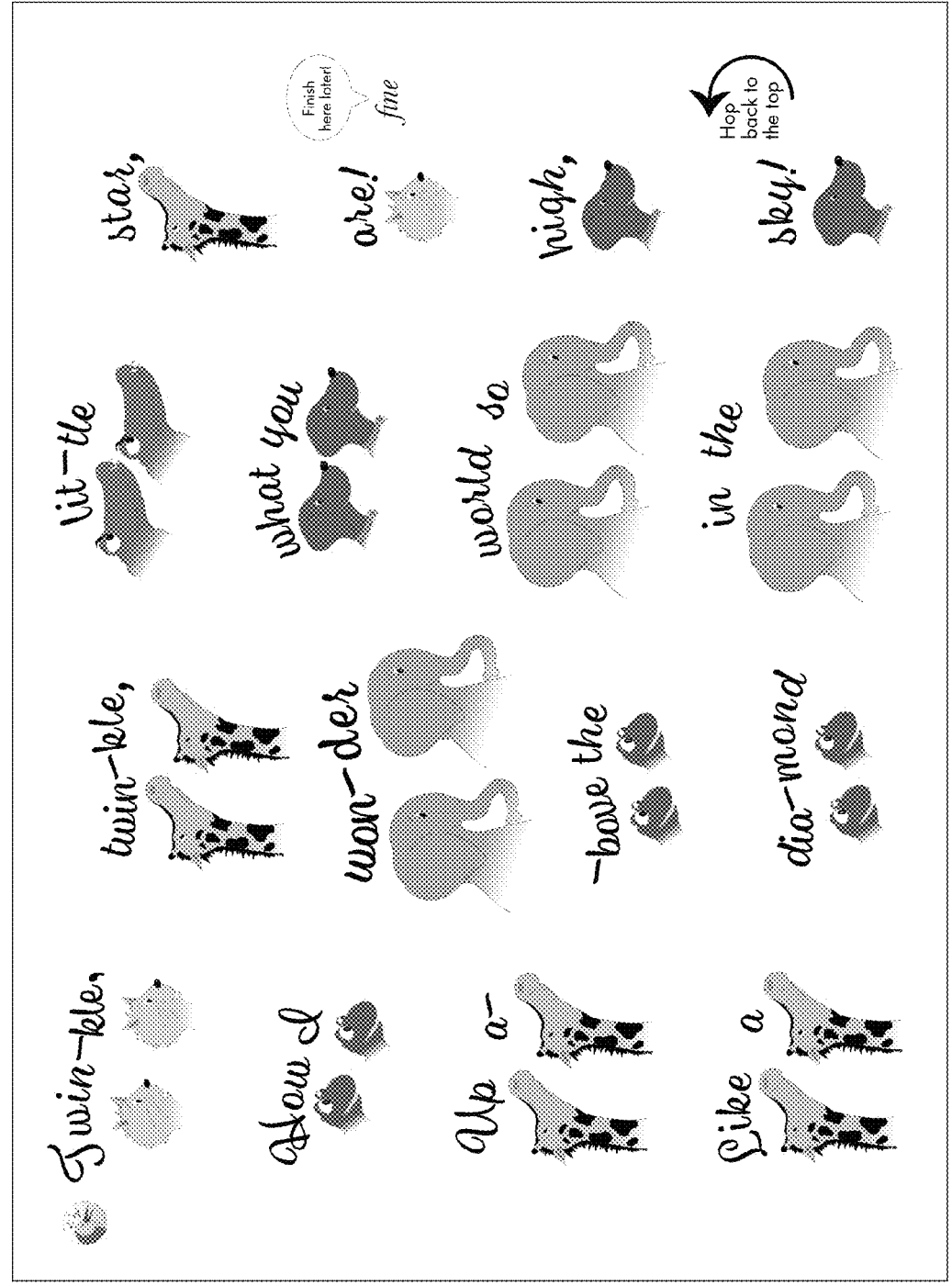
FIG. 19 illustrates one of many initial songs from the presentation medium, where animals are used to represent respective notes, as the child learns to associate the animals with representative notes, play and sing the song.

FIGS. 13 and 14 illustrate in the presentation medium, the first of a continuous series of birthday party stories, one for each toy animal. The birthday party environment provides a continuing story or adventure which forms the basis for instruction of musical scales. The individual toy cakes are placed on the piano key that defines the start or end of the scale, with the instruction that the student's Queen Pinky finger or pinky finger needs to reach for the toy cake. In FIG. 13, cat (note C) is shown in his birthday hat, and the fingers and animals are shown to play a C scale on a keyboard. In FIGS. 17A to 17D, the dog or doggy (note D) is shown having a birthday party, with the illustrated presentation providing progressively increasing note and finger instructions (FIGS. 17B to 17C), and finally provided together with the keyboard and the dog animal with his blue birthday cake and balloons in FIG. 17D. In FIG. 14, the continuing series of birthday party stories shows giraffe (note G) having a birthday party. The scale begins on note G, and the frog toy animal (with sunglasses, and "on the mountain" sign) is played as a black note, resulting in a G major scale. The fingers to be used to play the notes are indicated in FIG. 15, as is a song for naming the notes as their respective animals, and "sneaking" (indicated by arrows) the Boss Thumb position to play the notes with the proper fingers in the proper sequence. Additionally, every birthday party story for every toy animal is assigned a different color. In the example of FIGS. 14 to 17, giraffe's birthday party environment is used, is assigned the color purple, and may include a corresponding purple birthday cake. Physical objects, for example in the shape of the birthday cakes 32, or tokens 33 displaying an image of the birthday cakes, in either plastic or paper, are each configured with a different design and/or color, as in the note G giraffe animal example shape shown in FIG. 14. The individual cake objects or the animals may be placed on the piano keys that define the beginning and/or end of the scale, with the instruction that the student's Queen Pinky finger or pinky finger needs to reach for the cake or the animal.

Figure 20:
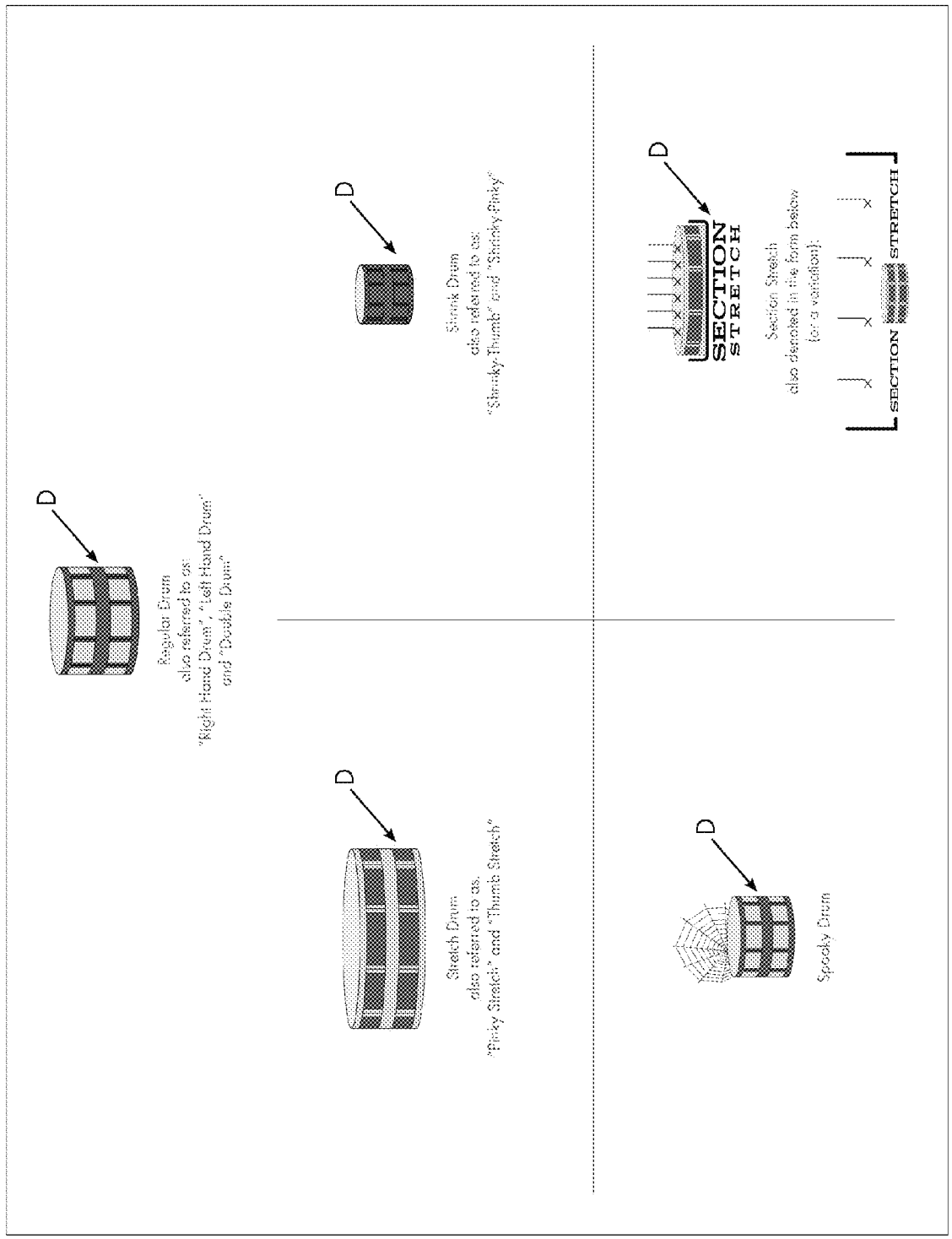
FIGS. 20 and 20A illustrate additional representative symbols—in FIG. 20 there are various drum symbols—used to represent various types of musical chords.
Figure 22:
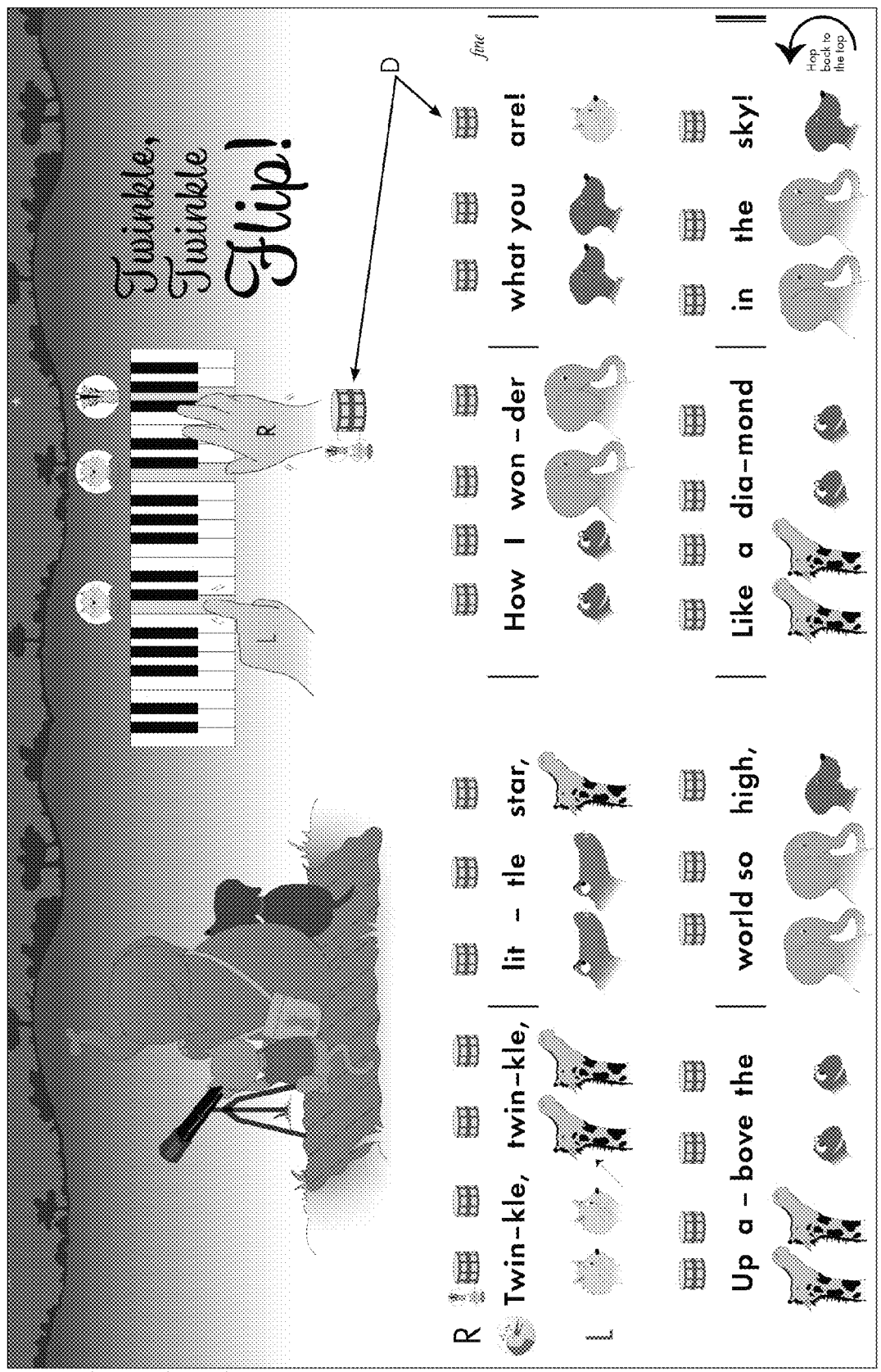
FIG. 22 illustrates from the presentation medium another or a next progression showing a combination of the animals, symbols and techniques initially used in FIGS. 19-21 to play chords and notes of a melody using the right and left hands. The "flip" instruction means the right and left hands are performing opposite tasks, from those presented in a prior illustration.
Figure 23:
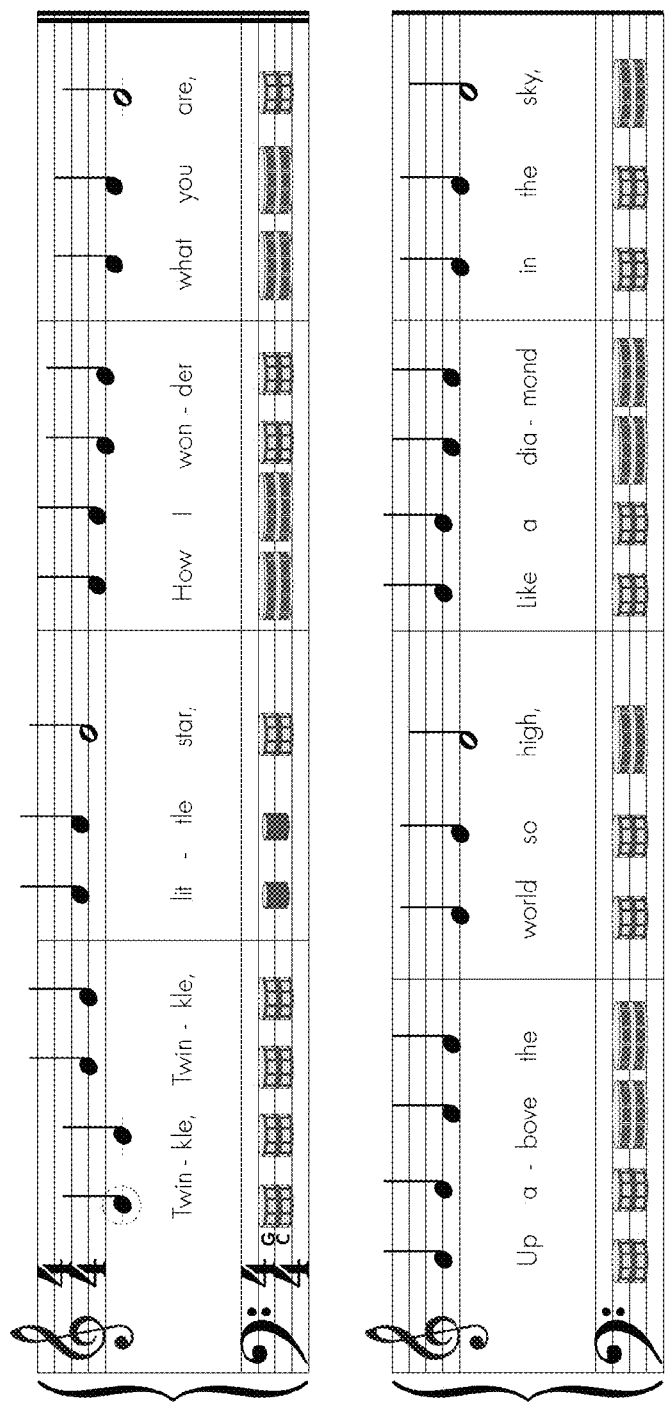
FIG. 23 illustrates a more advanced progression from the presentation medium using the system and method, where a musical staff and notes are now used, and additional chords represented by drum symbols, to perform a melody and chords previously in part illustrated as in FIG. 22.

In FIG. 20 images of additional representative symbols—various drum images—are used to represent various types of musical chords, which may also be represented as physical objects with an image displaying a drum D, in either paper or plastic materials for use in music theory practice or playing a board game. The drum symbols are used to instruct the playing of chords with various hand and finger configurations, as shown in FIGS. 22 to 24. Additional symbols along the lines shown in FIG. 34 may also be used, either as physical objects or as images within presentation medium materials, to represent various musical notation and features within the series of continuing stories or adventure environments.

Figure 25:
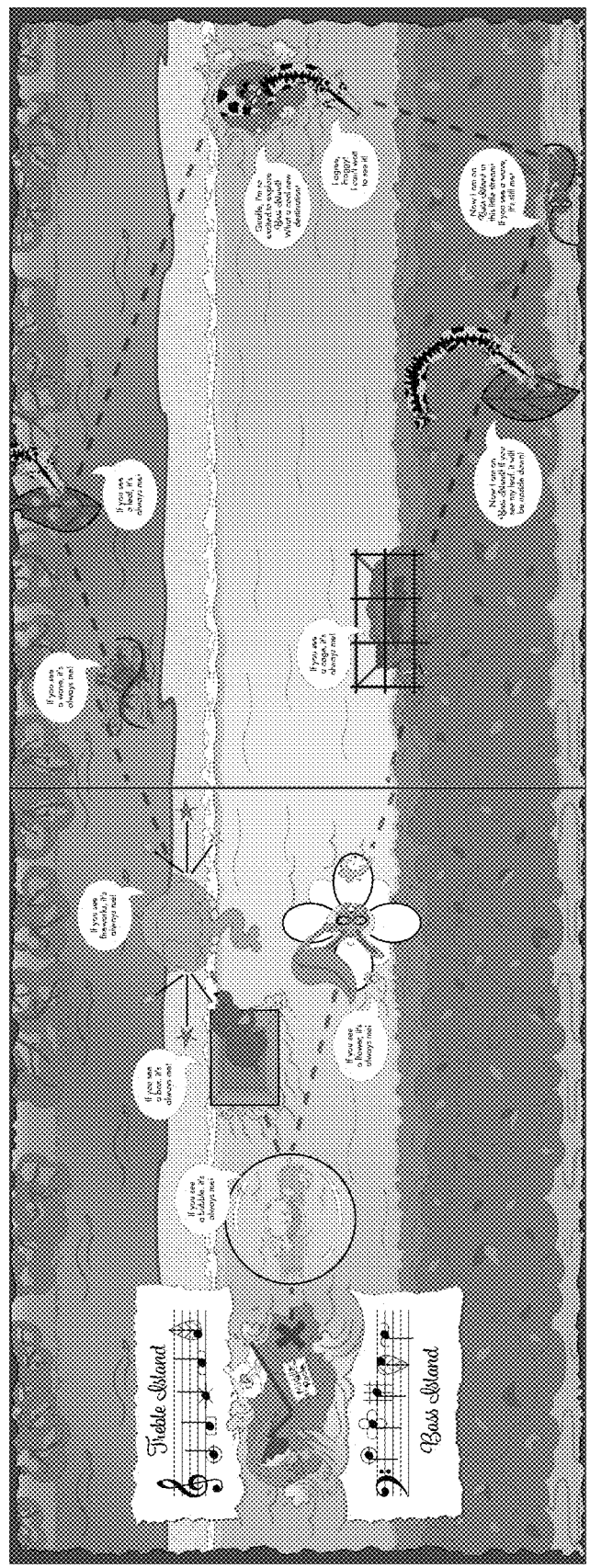
FIG. 25 illustrates an introduction used in the presentation medium to a new environment where the musical notes and notation, including the treble clef staff and bass clef staff are being taught, and where the staffs are represented by the adventure story of the Stripy Islands, which are separated as shown by water with a Middle Rock (note middle C) represented between the "islands" or staffs.
Figure 26:
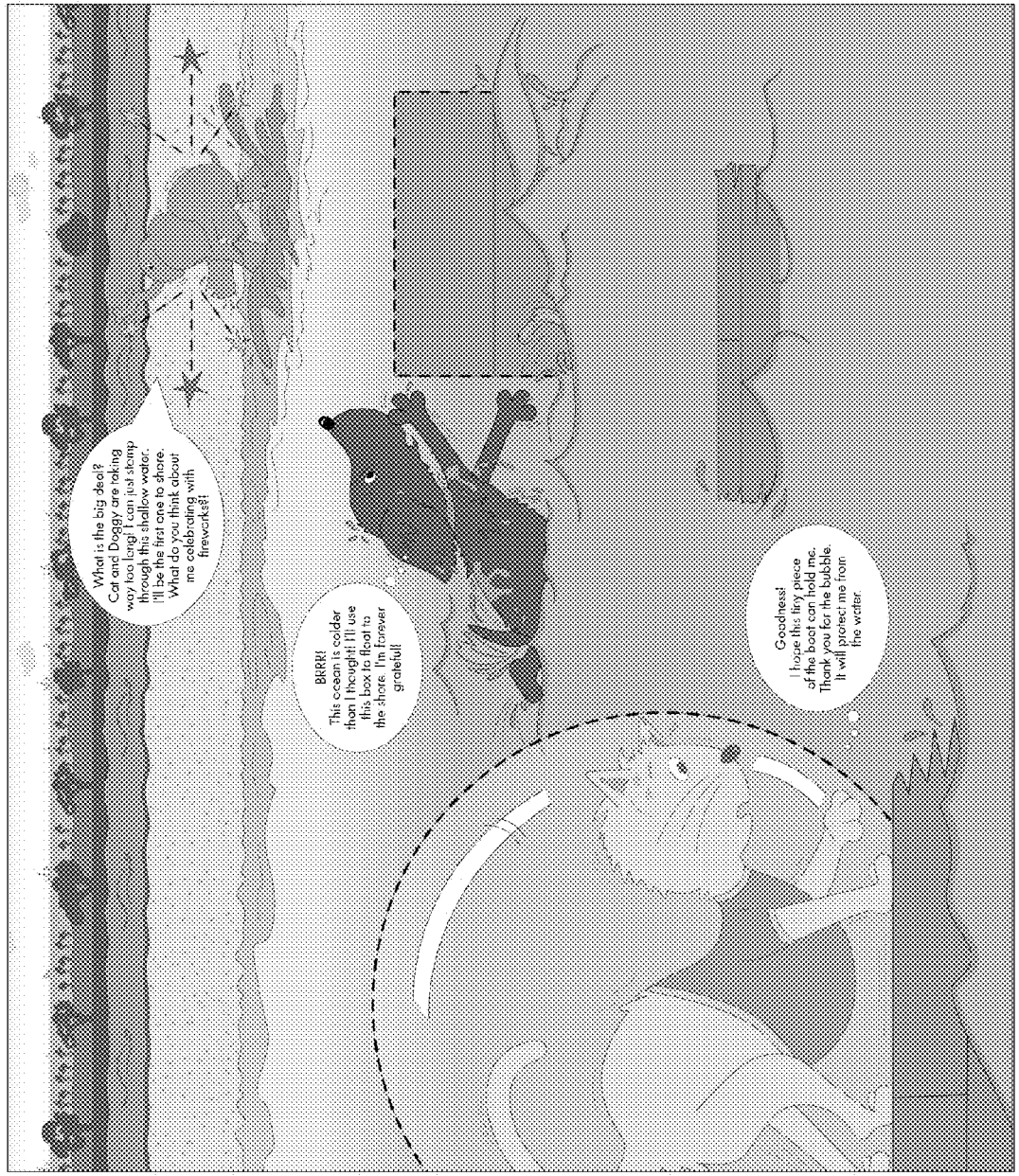
FIG. 26 illustrates an introduction as in FIG. 25, where Treble Island is representative of the treble clef staff, and, for example, the cat—for note C—is represented as a note with a dashed bubble surrounding the cat, as in the story.
Figure 27:
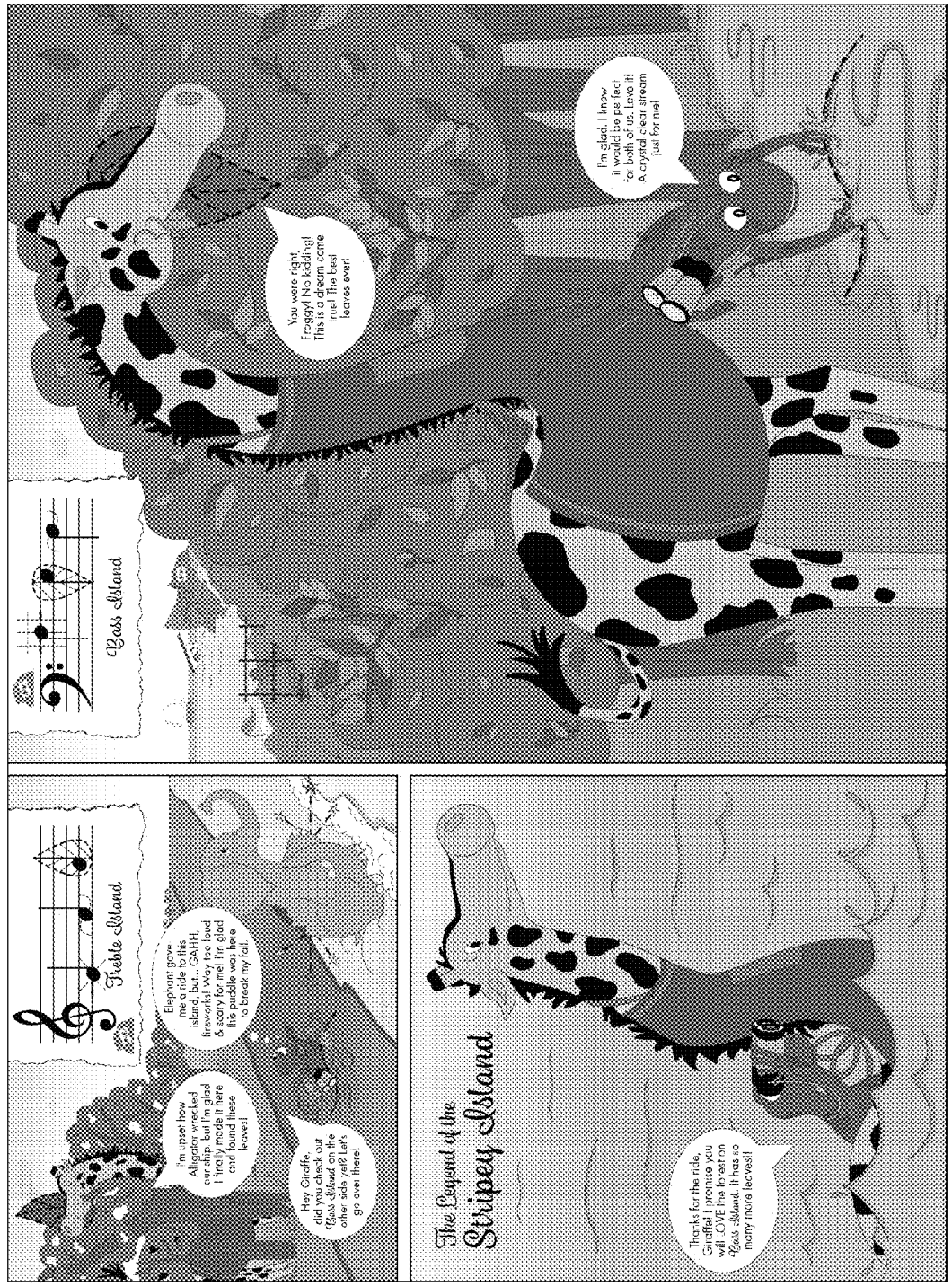
FIG. 27 illustrates an introduction as in FIG. 25, where each of the notes in Bass Island and Treble Island are individually introduced as shown.
Figure 28:
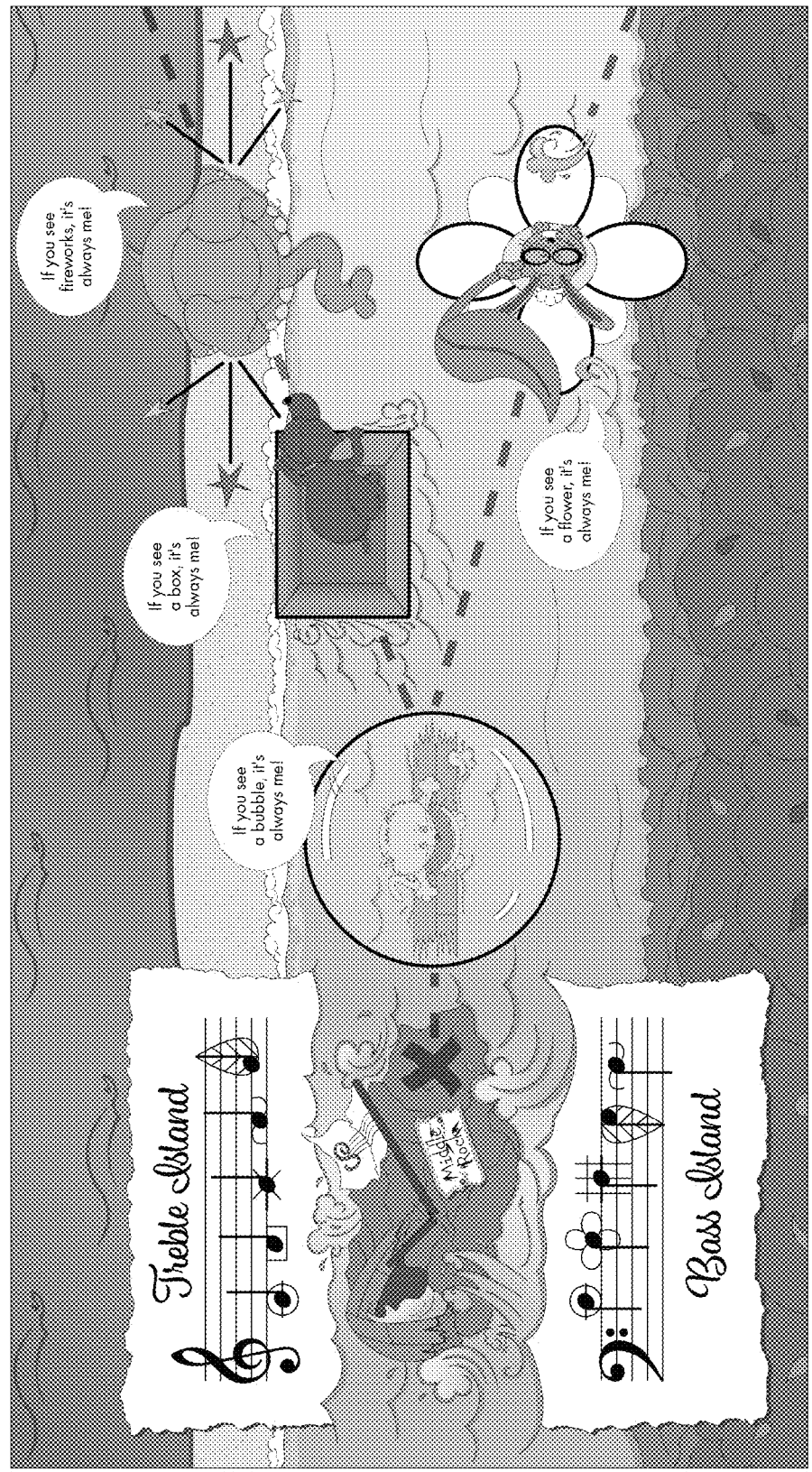
FIG. 28 illustrates an introduction as in FIG. 25, where further notes in Treble Island and Bass Island are introduced together as a full staff, as shown.
Figure 29:
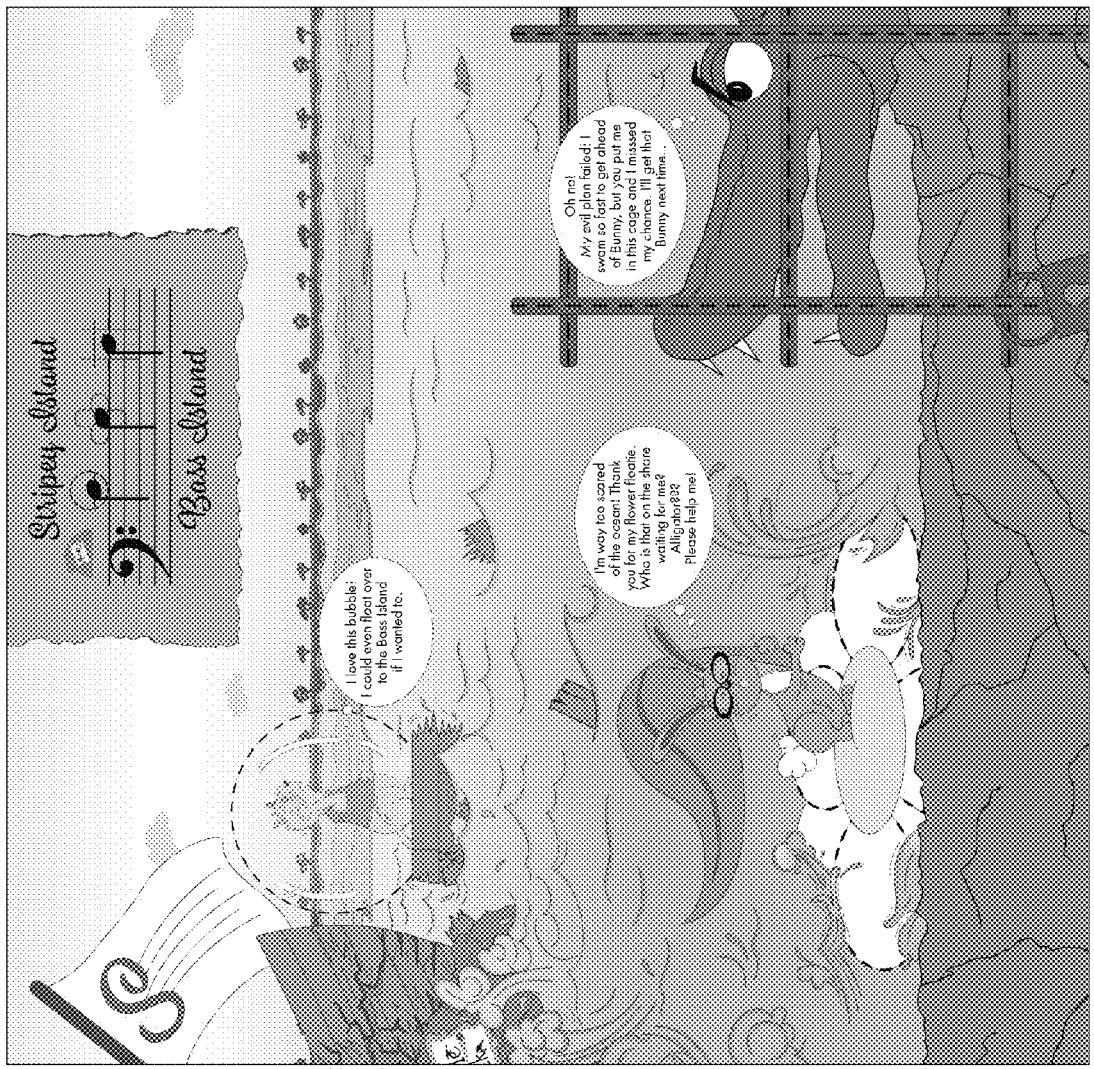
FIG. 29 illustrates an introduction as in FIG. 25, where further notes in Bass Island are introduced, as shown.
Figure 30:
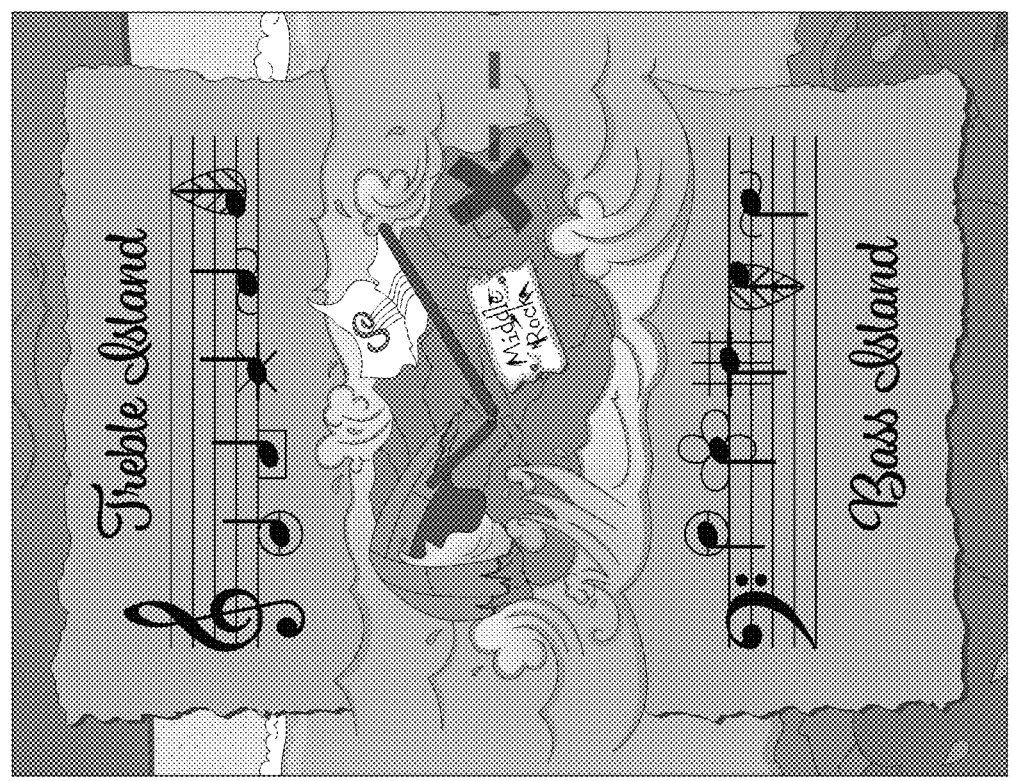
FIG. 30 illustrates the location of "Middle Rock", which is a physical object or a toy rock between the Treble Island and the Bass Island, where the toy animals' boat is wrecked in the environment of the continuing Stripy Island story.

Another adventure environment in the continuing story of the animals is represented by the story of Stripy Island, which story is used to teach the musical notes and notation related to the treble clef staff and bass clef staff. FIG. 25 shows the story environment where the staffs are "islands" separated by water with a Middle Rock represented between the "islands" or staffs. In this continuing series environment, Treble Island is representative of the treble clef staff, and, for example, the cat—for note C—is represented as a note with a bubble surrounding the cat, as in the story. Each of the notes in Bass Island, representative of the bass clef staff, and Treble Island are individually introduced using the animals together with a symbol representing each animal. "Middle Rock", which may be a physical object with an image of a rock, may be positioned between the Treble Island and the Bass Island, where the toy animals' boat is wrecked in the environment of the continuing Stripy Island story, and defines the center and becomes a point of reference for the students to orient themselves between the treble clef staff and the bass clef staff represented by the Treble and Bass Islands in the Stripy Island story and game. It is noted that the a plastic movable toy object of Middle Rock may be used in music theory practice with the student, or in a Stripy Island game that enables note identification as either a board game and/or an interactive video game.

Figure 31:
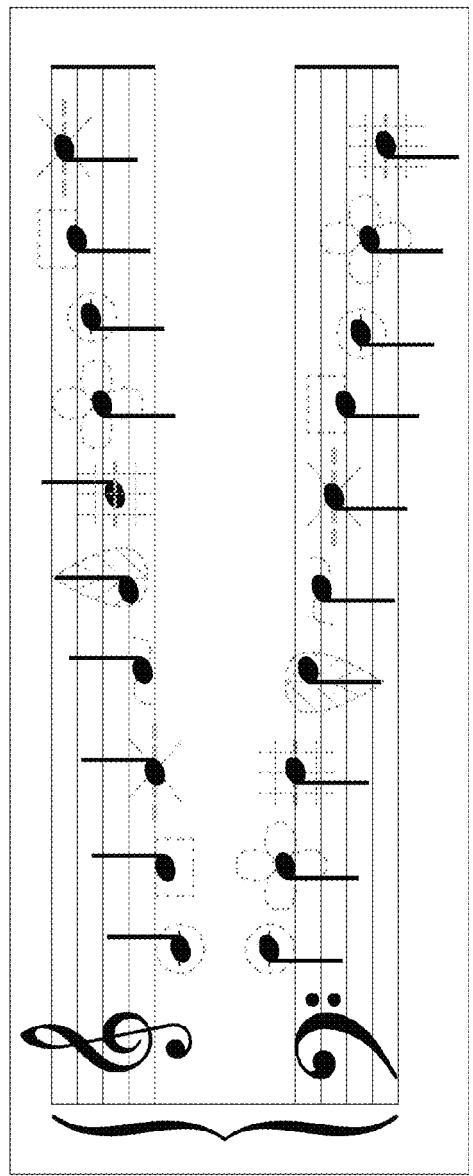
FIG. 31 illustrates a full staff used in the presentation medium, and illustrates each of the musical notes on the staff surrounded by the assigned symbol which represents the toy animal within the story of Stripy Island.
Figure 35:
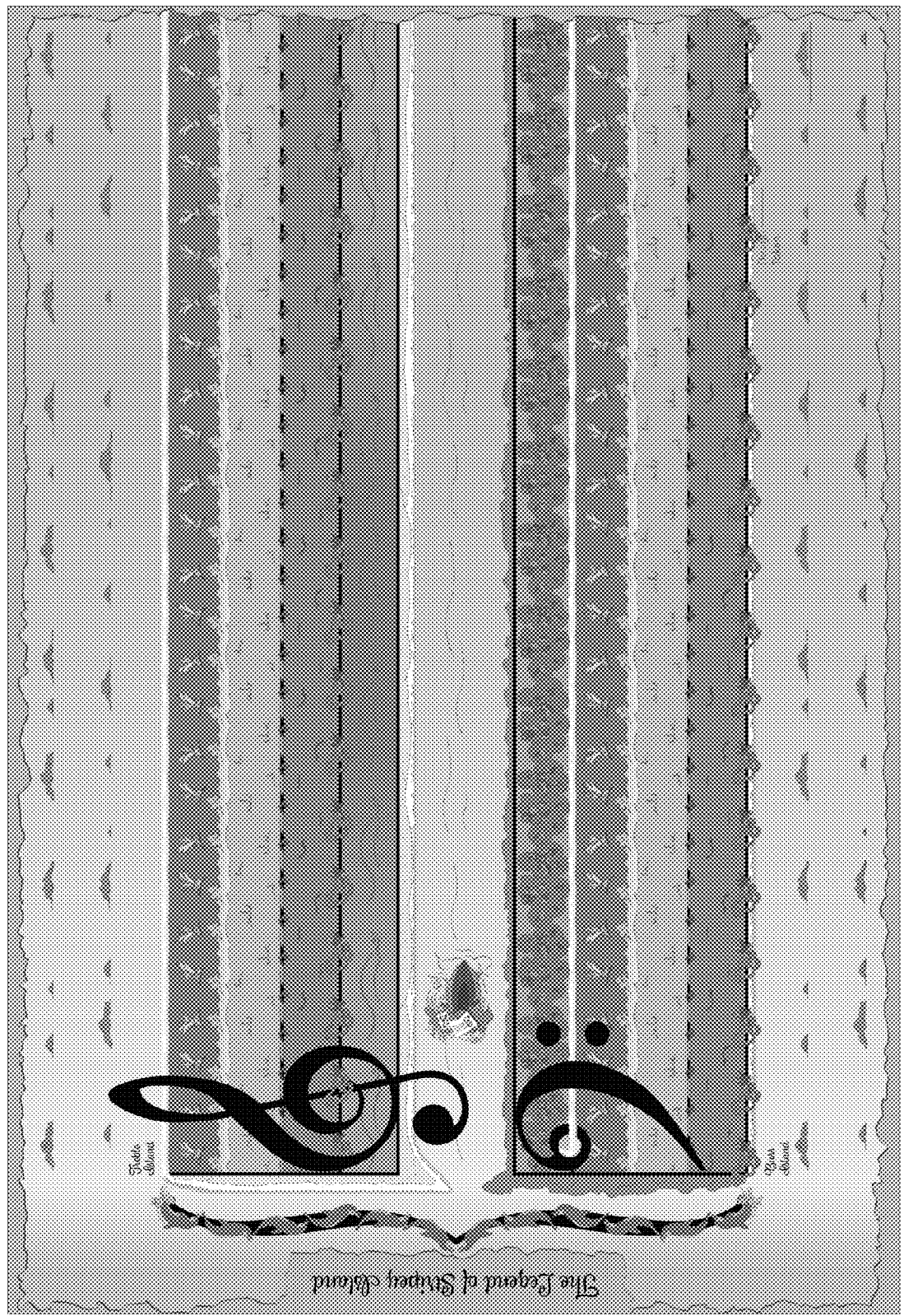
FIG. 35 illustrates a top view of a game board, whether in a physical or electronic format, for use in playing the Stripy Island game for music theory development.

FIG. 31 illustrates a full staff used in the presentation medium, and illustrates each of the musical notes on the staff surrounded by the assigned symbol which represents the animal within the story of Stripy Island. For example, the specific animals assigned to each musical note are displayed on a musical staff as a specific shape, comprising the bubble shape associated with the cat, the box shape associated with the dog, the firework or asterisk shape associated with the elephant, the flower shape associated with the bunny, the cage or grid shape associated with the alligator, the symbol "~" or a "wave" shape associated with the frog, and the leaf shape associated with the giraffe, where the leaf shape points upward when noted on the treble clef staff, and points downward when noted on the bass clef staff. Each of these images may be displayed on physical objects for use in connection with music theory practice, or for use with the Stripy Island game, a sample of which is shown in FIG. 35.

It is noted that in the sample game board of Stripy Island, the musical staffs of Treble Island or Bass Island, or the treble and bass clefs, are depicted with the spaces or staff lines for: the note F shown as an image of a stream line and a pond space to be associated with the frog animal note, the note E shown as an image of a pineapple space and a sandy beach to be associated with the elephant animal note, the note D shown as an image of a river raft line with waves to be associated with the dog animal note, the note C shown as an image of a grass space to be associated with the cat animal note, the note B shown as an image of a carrot line to be associated with the bunny animal note, the note A shown as an image of a mud space and rocky line to be associated with the alligator animal note, and the note G shown as an image of a forest tree line and space to be associated with the giraffe animal note. Displaying the continuing themes and environments of Stripey Island through the images of the animals as notes within their corresponding and respective physical natural environments enables the student to continue associations of the animals and notes while advancing their musical theory and note reading education.

Figure 32:
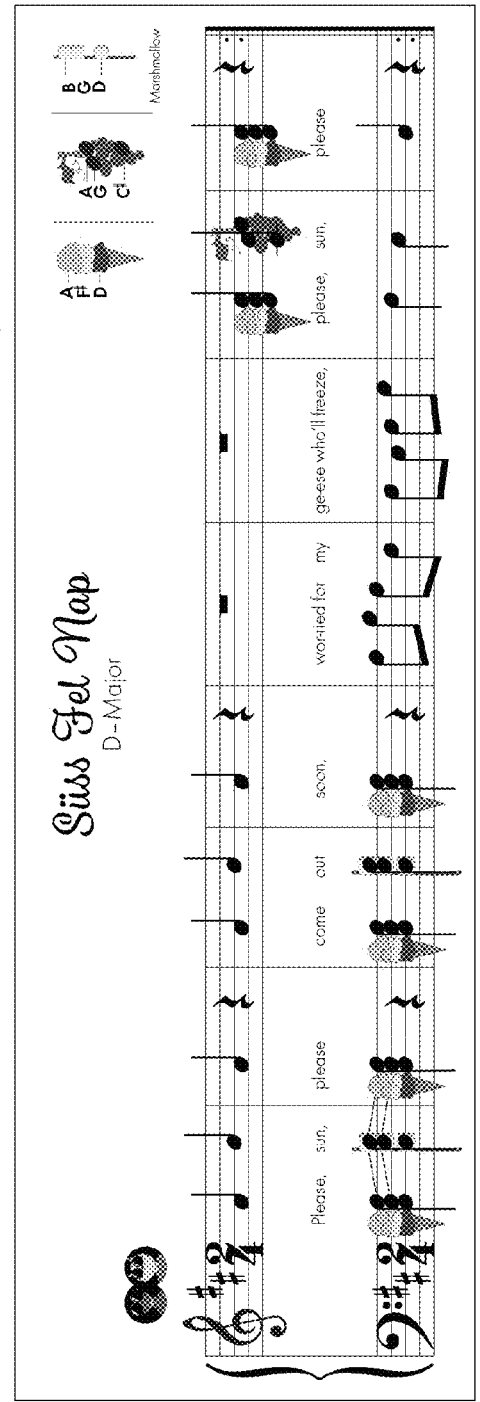
FIGS. 32, 33 and 34 illustrate music notation used in the presentation medium for the more advanced student, but show continuing incorporation of animals with sunglasses or binoculars to represent the notes or key signature for the student, as well as the use of drums for chords, and new symbols to represent new chords having specific notes represented with animal notes, taking the form of an ice cream cone, a bunch of grapes, marshmallows on a stick, and a slice of pizza, for example, which may all have physical representations in objects, such as tokens, toys or charms.
Figure 33:
Figure 36:
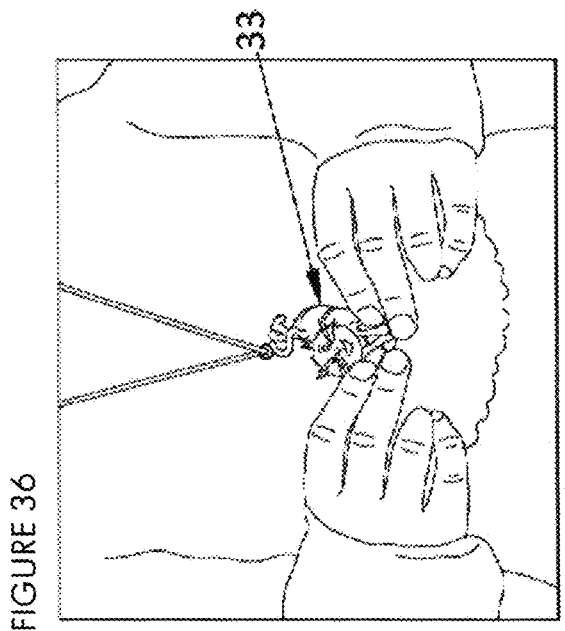
FIG. 36 illustrates a child or student wearing a necklace supporting a charm or reward bearing the image of a cat representing the note C.
Figure 34:
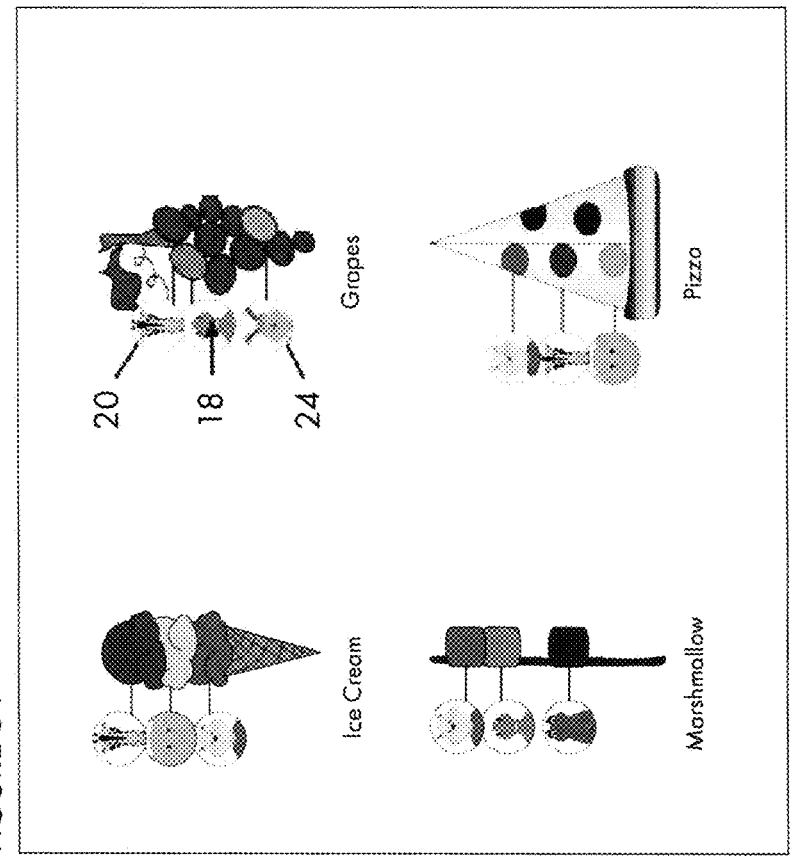

More advanced students may use various musical notation and features within the series of continuing stories or adventures, but, as shown in FIGS. 32 and 33, still incorporate the animals in various forms (with sunglasses) to represent the notes or key signature for the student, as well as the use of drums for chords (as in FIG. 20), and new symbols to represent new chords having specific notes. For example, several chords are represented in FIG. 34, shown with the animal notes near the chord symbols taking the form of ice cream cones, a bunch of grapes, marshmallows on a stick and a slice of pizza, which may all have physical representations in physical objects displaying an image of the chords, such as a toy, token, charm, ring, arm band, tattoo or sticker. In FIG. 36, the physical objects may be provided to the student as a charm or reward in a variety of forms.

Figure 20A:
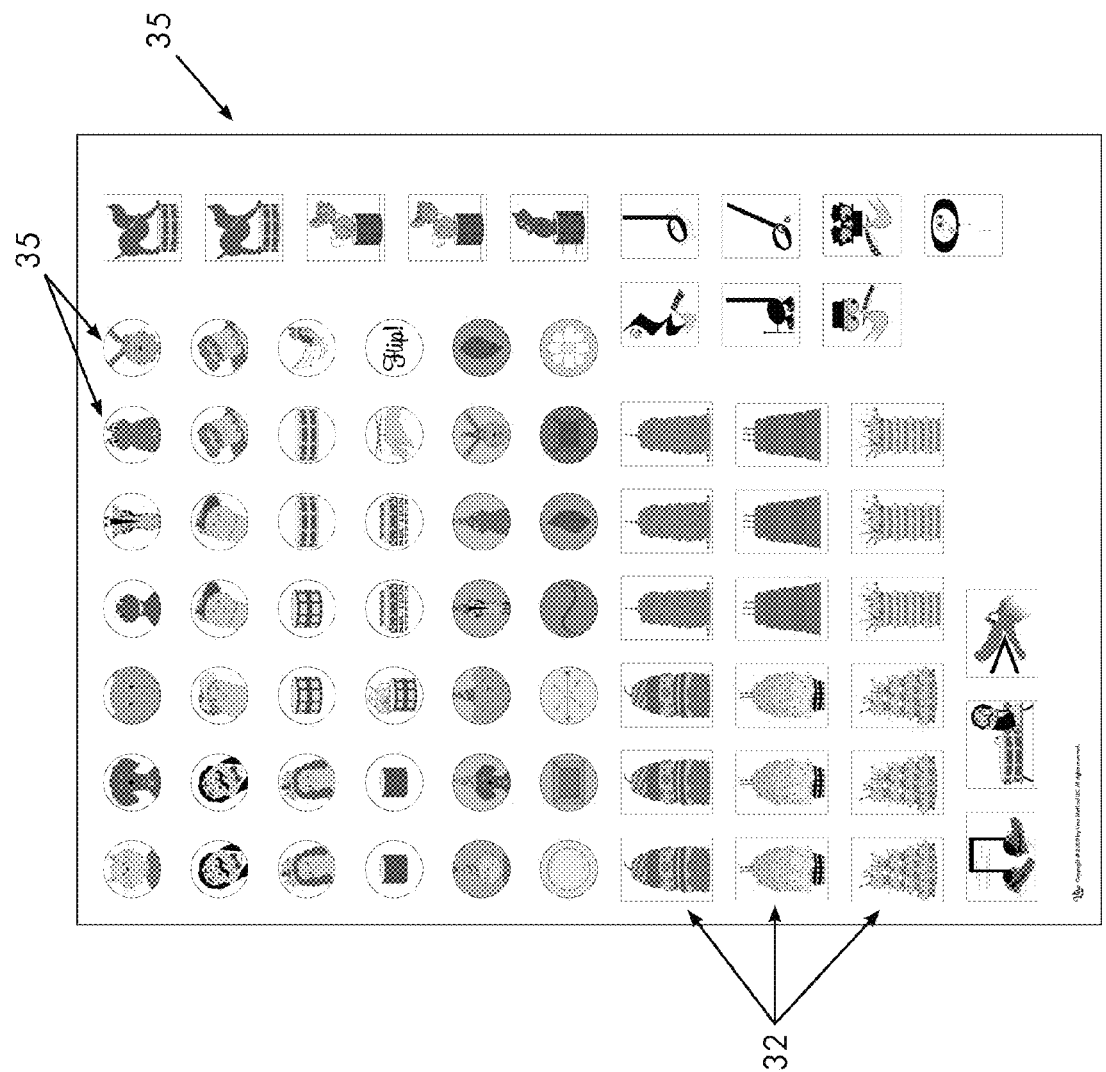
Figure 21:
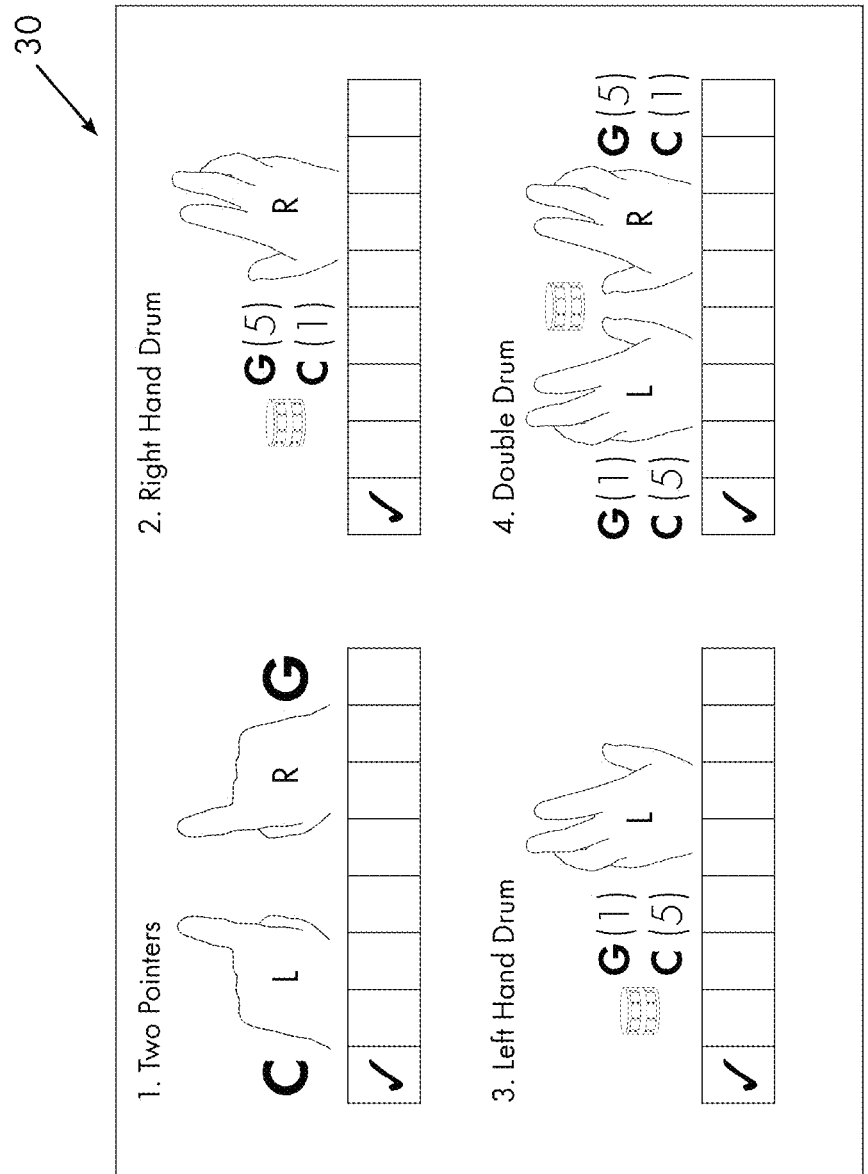
FIG. 21 illustrates from the presentation medium, how the drum symbol is used to practice playing chords with two fingers on two hands, with the right hand, the left hand, and with both hands.

It should be understood that the system and method of the present application may be provided as a kit of materials for use by a teacher, and as a kit of materials for use by a student. For example, a kit for learning to play the piano and reading musical notes would contain presentation materials, either in the form of books or a computer program for use on a laptop, tablet, smart phone or other electronic device. Tokens would be provided, with each token bearing the image of one of the 7 different animals representing the 7 musical notes. A dog house and an animal house as shown in FIGS. 5 to 7 would also be provided. The external shapes of and images on the flat or board pieces, would be of a dog house with 1 door and an animal house with 2 doors. The dog house would include 2 slots for positioning on a group of 2 adjacent black keys of the piano keyboard, with the image of the 1 door positioned between the 2 adjacent black keys. The animal house would include 3 slots for positioning on a group of 3 adjacent black keys of the piano keyboard, with the image of one of the doors positioned between a left key and a center key of the group of black keys of a piano keyboard, and the second door positioned between the center key and a right key of the group of 3 adjacent black keys of a piano keyboard. Rings 34 would also be included for wearing on fingers, and displaying the images of at least 5 different characters representing each of the fingers on one hand. A mirror image set of an additional 5 characters for the fingers on a second hand would also be provided, as would an armband displaying an image of an eye for wearing adjacent an elbow to teach proper body position. A sheet of stickers bearing the various symbols, as in FIG. 20A, may also be provided for use with the presentation materials or provided as rewards for the child after completing assigned tasks.

Although the system, method, kit and game of the present application have been described in detail sufficient for one of ordinary skill in the art to practice the invention, it should be understood that various changes, substitutions and alterations may be made without departing from the spirit or scope provided and defined in the attached claims. Moreover, the scope of the present application is not intended to be limited to the specific embodiments described here, which are provided by way of example. As one of ordinary skill in the art will readily appreciate from the disclosure of the present application and its embodiments, other components and means presently existing or later to be developed that perform substantially the same function to achieve substantially the same result as those of the corresponding embodiments described here, may be utilized according to the present application. Accordingly, the appended claims are intended to include within their scope such other components or means.

I claim:

1. A combination of tools for teaching children to play the piano and read musical notes using specific characters assigned to each finger and a specific animal assigned to each musical note, where each specific character and specific animal are provided as physical objects to be associated with each respective finger and musical note, each specific character assigned to each finger is displayed as an image on the physical objects, including tokens, charms, rings, stickers or tattoos which may be engaged or supported on the assigned finger during playing of the piano, each specific animal is assigned a specific color and is displayed as an image on the physical objects, including physical toys, tokens, charms, rings, or stickers to be engaged with and supported on the assigned musical notes and piano keys represented by the specific animals and representative physical objects during playing of the piano keys, all of the specific animals are incorporated within environment depicting musical notation and are presented in a series of continuing stories including using a house, which is a physical object for positioning adjacent black keys of a piano keyboard, as part of a themed story for teaching the location of black keys on a piano keyboard.

2. The combination of tools of claim 1, wherein the specific character assigned to the thumb is an image of a Boss Thumb character, and the specific character assigned to the little or pinky finger is an image of a Queen Pinky character.

3. The combination of tools of claim 1, wherein the series of continuing stories used to teach musical scales uses a birthday party theme for each specific animal assigned to each musical note.

4. The combination of tools of claim 3, wherein for each specific animal assigned the specific color, a physical object displaying an image of a birthday cake is assigned a corresponding specific color, and the representative physical object displaying the image of the birthday cake, including physical toys, tokens, charms, rings, or stickers is engaged on or adjacent the first or last note of the scale corresponding to the specific animal to be played by a child, and identifies the first or last note of the scale being played on the piano keys.

5. The combination of tools of claim 1, wherein the physical object having an external shape of, and displaying an image of, the house having an image of at least one door, and the physical object is supported on or immediately adjacent a group of two black keys of a piano keyboard.

6. The combination of tools of claim 1, wherein the physical object having an external shape of, and displaying an image of, the house having an image of two doors, and the physical object is supported on or immediately adjacent a group of three black keys of a piano keyboard, with the image of one door positioned between a left key and a center key of the three black keys of a piano keyboard and the second door positioned between a center key and a right key of the group of three black keys of a piano keyboard.

7. The combination of tools of claim 1, wherein a physical object displaying an image of an eye is supported adjacent to an elbow of child learning to play the piano, and the physical object may be an arm band, a toy, a token, a charm or a sticker.

8. The combination of tools of claim 1, wherein the physical objects displaying the images of the specific animals assigned to each musical note comprise a cat, a dog, an elephant, a frog, a giraffe, an alligator and a bunny.

9. The combination of tools of claim 8, wherein the images of the specific animals with specifically assigned colors are assigned to each musical note and are displayed on a musical staff within the presentation materials, and are additionally assigned as a specific non-animal shape, comprising a bubble shape associated with the cat, a box shape associated with the dog, a firework or asterisk shape associated with the elephant, a flower shape associated with the bunny, a cage or grid shape associated with the alligator, a symbol "~" or a "wave" shape associated with the frog, and a leaf shape associated with the giraffe which points upward on the treble clef staff and points downward on the bass clef staff.

10. The combination of tools of claim 1, wherein each specific animal assigned a specific color and displayed as an image on the physical objects, is additionally displayed as an image of the specific animal with eyewear, including sunglasses or binoculars, and indicates that the note to be played is a black piano key, or a sharp of the musical note represented by the specific animal during playing of the piano keys.

11. The combination of tools of claim 1, wherein each specific animal assigned a specific color and displayed as an image on the physical objects, is additionally displayed as an image of the specific animal with ears in a downward position, and indicates that the note to be played is a black piano key, or a flat of the musical note represented by the specific animal during playing of the piano keys.

12. A kit for learning to play the piano and reading musical notes, comprising:
   presentation materials, including pages of information, books or electronic images in a computer program for use on a laptop, tablet, smart phone or other electronic device;
   tokens bearing the images of 7 different animals representing 7 musical notes;
   a board having an external shape of, and displaying an image of, a dog house with one door, and having two slots for positioning on a group of two adjacent black keys of the piano keyboard;

a board having an external shape of, and displaying an image of, an animal house with two doors, and having three slots for positioning on a group of three adjacent black keys of the piano keyboard; and rings for wearing on fingers, and displaying the images of at least five different characters representing fingers on one hand.

13. The kit of claim 12, wherein the tokens with images of the seven different animals include a cat, a dog, an elephant, a frog, a giraffe, an alligator, and a bunny.

14. The kit of claim 12 for learning to play the piano and reading musical notes, further comprising an armband for wearing on an elbow, the armband displaying an image of an eye.

15. The kit of claim 12 for learning to play the piano and reading musical notes, wherein the presentation materials display a tune to be played by arranging images of the different animals in the place of the musical notes represented by the different animals.

16. The kit of claim 13 for learning to play the piano and reading musical notes, wherein tokens bearing images of animals may additionally include a specific shape representing each musical note, including a bubble shape associated with the cat and note C, a box shape associated with the dog and note D, a firework or asterisk shape associated with the elephant and note E, a flower shape associated with the bunny and note B, a cage or grid shape associated with the alligator and note A, a symbol "~" or a "wave" shape associated with the frog and note F, and a leaf shape associated with the giraffe and note G, and the presentation materials display a tune to be played by arranging images of the specific shapes in the place of the musical notes.

17. A combination of tools for teaching children to play the piano and read musical notes using specific characters assigned to each finger and a specific animal assigned to each musical note, where each specific character and specific animal are provided as physical objects to be associated with each respective finger and musical note, each specific character assigned to each finger is displayed as an image on the physical objects, including tokens, charms, rings, stickers or tattoos which may be engaged or supported on the assigned finger during playing of the piano, each specific animal is assigned a specific color and is displayed as an image on the physical objects, including physical toys, tokens, charms, rings, or stickers to be engaged with and supported on the assigned musical notes and piano keys represented by the specific animals and representative physical objects during playing of the piano keys, and a physical object is supported adjacent to an elbow of child learning to play the piano as a reminder of proper body position while playing the piano, and the physical object may be an arm band, a toy, a token, a charm, a tattoo or a sticker.

* * * * *